US008990868B2

(12) United States Patent
Lee et al.

(10) Patent No.: US 8,990,868 B2
(45) Date of Patent: Mar. 24, 2015

(54) DISPLAY DEVICE AND METHOD FOR DISPLAYING CONTENTS ON THE SAME

(75) Inventors: Jungbin Lee, Seoul (KR); Ryoung Kim, Daejeon (KR); Jun Kim, Seoul (KR); Ubeom Heo, Seoul (KR); Jiwan Nam, Seoul (KR); Samsoo Lee, Gyeonggi-Do (KR); Ilhyun Kim, Gyeonggi-Do (KR); Namhoon Kim, Jeju-Do (KR); Sungmin Baek, Gyeonggi-Do (KR); Eunhae Cho, Seoul (KR); Jaehee Chung, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 453 days.

(21) Appl. No.: 12/985,859

(22) Filed: Jan. 6, 2011

(65) Prior Publication Data

US 2011/0205435 A1  Aug. 25, 2011

(30) Foreign Application Priority Data

Jan. 6, 2010 (KR) .................. 10-2010-0001032
Oct. 25, 2010 (KR) .................. 10-2010-0104271

(51) Int. Cl.
H04N 7/173 (2011.01)
H04N 5/445 (2011.01)
H04N 21/478 (2011.01)
H04N 21/482 (2011.01)
H04N 21/488 (2011.01)
H04W 4/00 (2009.01)

(52) U.S. Cl.
CPC ......... *H04N 5/44543* (2013.01); *H04N 21/478* (2013.01); *H04N 21/482* (2013.01); *H04N 21/4882* (2013.01); *H04W 4/00* (2013.01)
USPC .............................. 725/91; 725/109; 725/110

(58) Field of Classification Search
USPC .......... 725/87, 88, 91, 92, 95, 103, 104, 111, 725/114, 133, 134, 144, 153; 348/563, 348/E05.099; 709/202, 219; 455/466
See application file for complete search history.

(56) References Cited

U.S. PATENT DOCUMENTS

| 7,877,776 | B2 * | 1/2011 | Krikorian et al. ............... 725/95 |
| 8,528,028 | B2 * | 9/2013 | Sheth et al. ...................... 725/91 |
| 2004/0039781 | A1 * | 2/2004 | LaVallee et al. ............... 709/205 |

(Continued)

FOREIGN PATENT DOCUMENTS

CN   101222591 A   7/2008
CN   101352034 A   1/2009

(Continued)

OTHER PUBLICATIONS

61045254_Rakib_et_al.pdf, U.S. Appl. No. 61/045,254, filed Apr. 15, 2008.*

(Continued)

*Primary Examiner* — Fernando Alcon
(74) *Attorney, Agent, or Firm* — KED & Associates, LLP

(57) ABSTRACT

A display terminal and a method for displaying content on the display terminal are embodied and broadly disclosed herein. The method may include displaying an indicator that indicates a presence of at least one new content available in a channel; displaying a list of the at least one new content in response to an acknowledgement request corresponding to the indicator; and connecting to the channel to display the at least one new content in response to an input, wherein the input is a selection of one or more of the at least one new content in the displayed list.

12 Claims, 39 Drawing Sheets

(56) References Cited

U.S. PATENT DOCUMENTS

| | | |
|---|---|---|
| 2004/0117836 A1* | 6/2004 | Karaoguz et al. ............... 725/81 |
| 2005/0010635 A1* | 1/2005 | Schwesig et al. ............. 709/203 |
| 2005/0229223 A1* | 10/2005 | Katagishi et al. ............. 725/100 |
| 2005/0229226 A1* | 10/2005 | Relan et al. ................... 725/114 |
| 2005/0246757 A1* | 11/2005 | Relan et al. ................... 725/135 |
| 2005/0262542 A1* | 11/2005 | DeWeese et al. ............. 725/106 |
| 2007/0288627 A1* | 12/2007 | Abella et al. ................. 709/224 |
| 2008/0117922 A1* | 5/2008 | Cockrell et al. ............. 370/401 |
| 2008/0155010 A1 | 6/2008 | Liwerant et al. |
| 2008/0155634 A1* | 6/2008 | Khedouri et al. ............. 725/118 |
| 2009/0164606 A1 | 6/2009 | Epifania et al. |
| 2009/0305732 A1 | 12/2009 | Marcellino et al. |
| 2009/0327894 A1* | 12/2009 | Rakib et al. .................... 715/719 |
| 2011/0078716 A1* | 3/2011 | MacWan ......................... 725/14 |
| 2011/0219413 A1* | 9/2011 | Krikorian et al. ............. 725/109 |
| 2012/0208510 A1* | 8/2012 | Engstrom et al. .......... 455/414.1 |
| 2013/0060875 A1* | 3/2013 | Burnett et al. ................ 709/206 |
| 2013/0152146 A1* | 6/2013 | Weaver .......................... 725/109 |
| 2013/0325970 A1* | 12/2013 | Roberts et al. ................ 709/206 |
| 2014/0112633 A1* | 4/2014 | Tan ................................ 386/223 |

FOREIGN PATENT DOCUMENTS

| | | |
|---|---|---|
| CN | 101447839 A | 6/2009 |
| EP | 1 653 703 A2 | 5/2006 |
| WO | WO 02/069585 A2 | 9/2002 |
| WO | WO 2005/041557 A1 | 5/2005 |

OTHER PUBLICATIONS

Anonymous: "YouTube Channel Complete Guide", Oct. 26, 2009.
Steve Lawrence: "App Store Essentials: WhatsApp Messenger", Dec. 17, 2009.
Anonymous: "Yahoo! Messenger for the iPhone", Nov. 17, 2009.
European Search Report dated Mar. 28, 2012.
Chinese Office Action issued in CN Application No. 201110044981.6 dated Nov. 28, 2012.
Apple: "iPhone User Guide" for iPhone OS 3.1 Software, 2009.
European Search Report dated Oct. 7, 2011.

* cited by examiner

FIG. 5
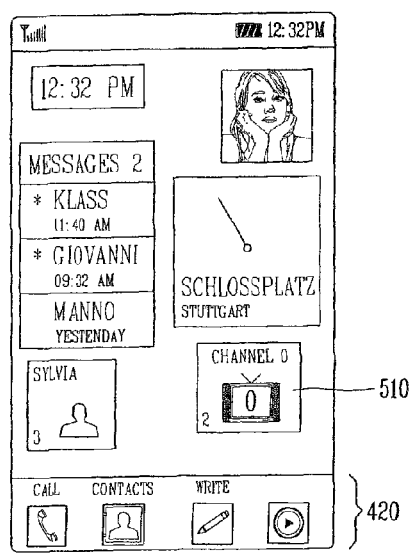
(a)
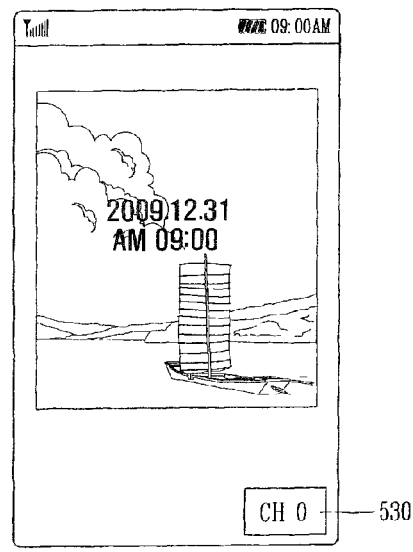
(b)
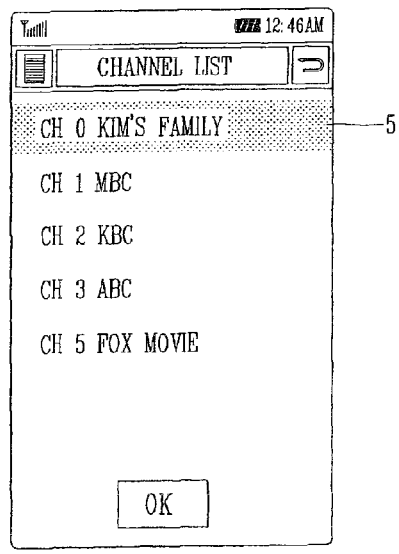
(c)
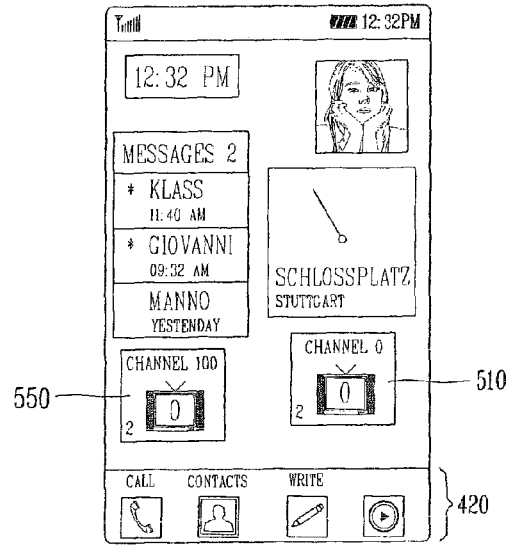
(d)

FIG. 7
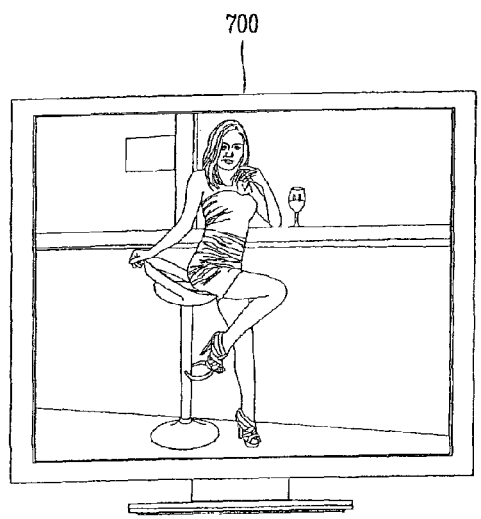
(a)
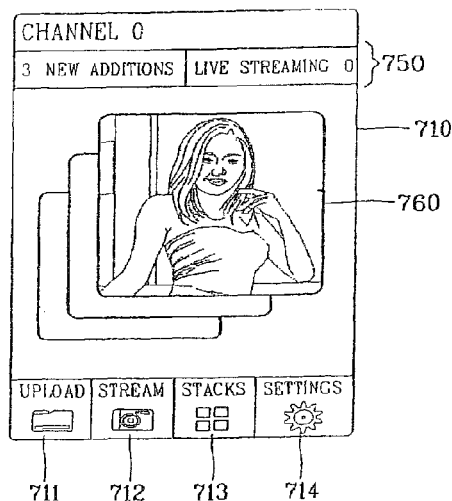
(c)
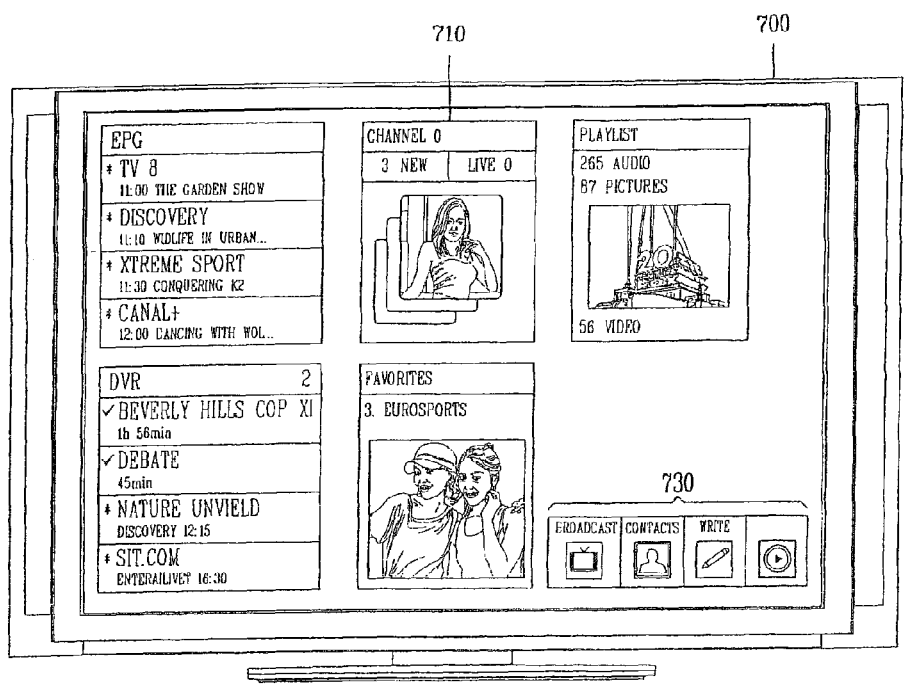
(b)

FIG. 8
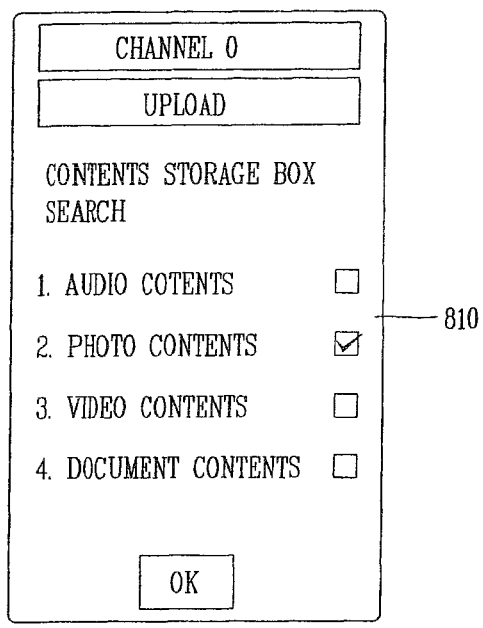
(a)
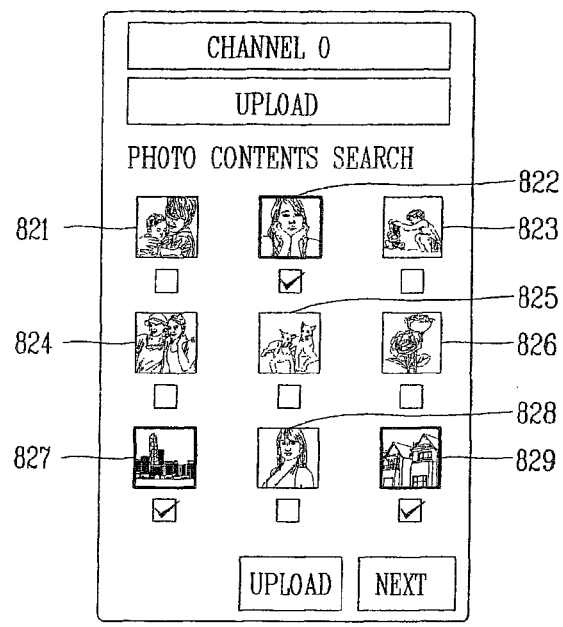
(b)
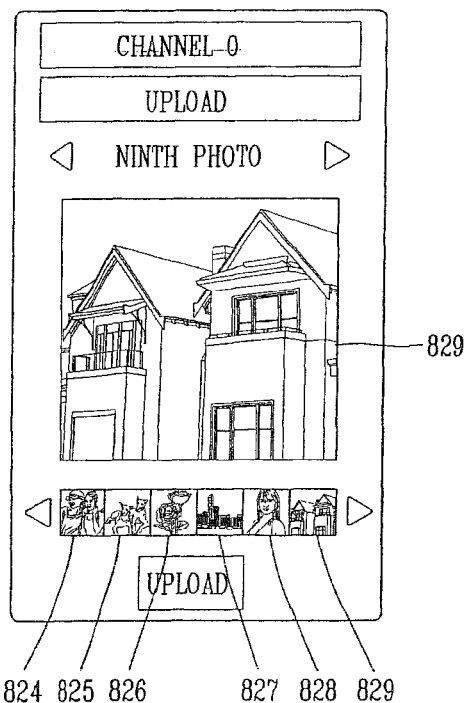
(c)

FIG. 10
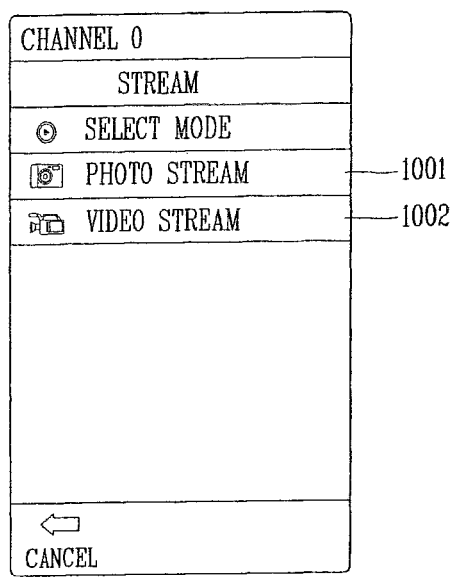
(a)
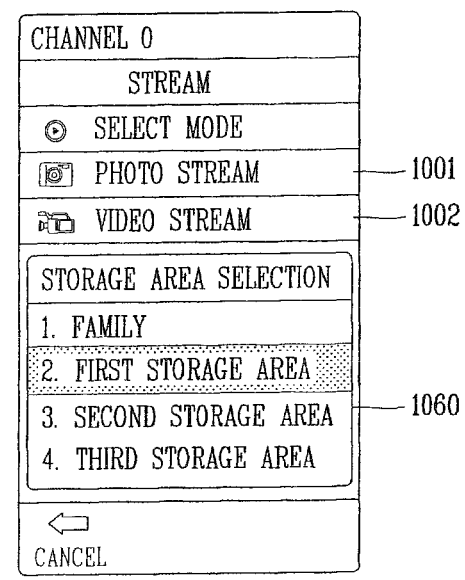
(b)

FIG. 11
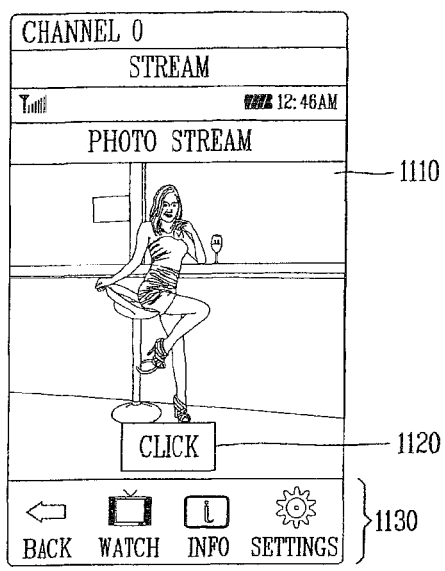
(a)
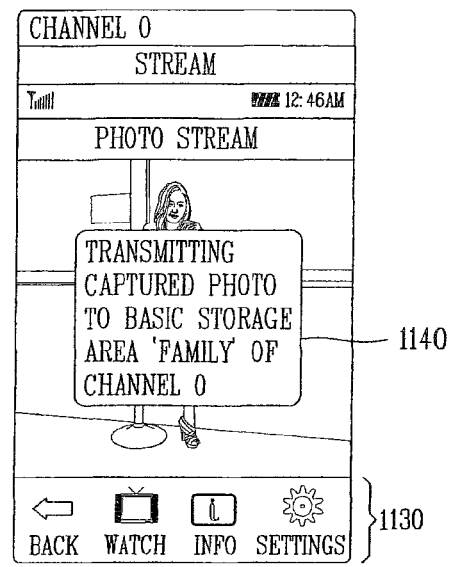
(b)

FIG. 12
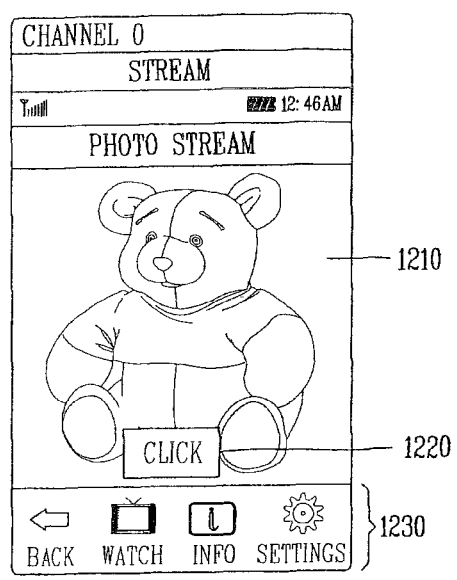
(a)
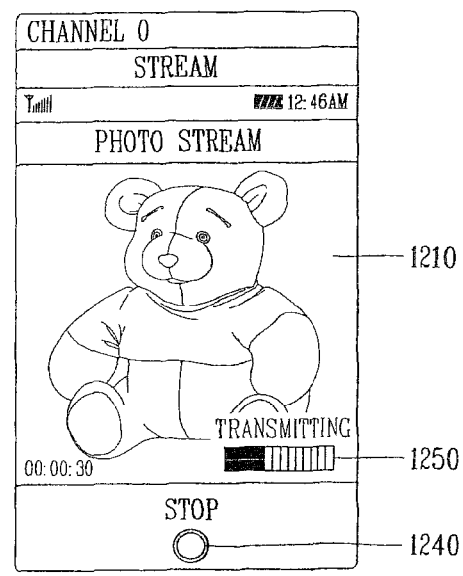
(b)

FIG. 14
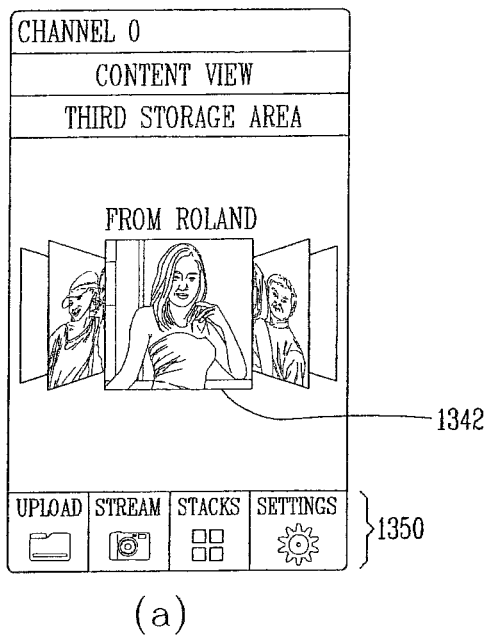
(a)
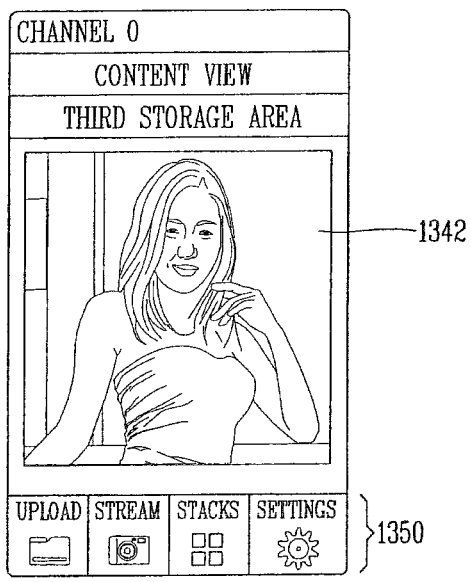
(b)

FIG. 15
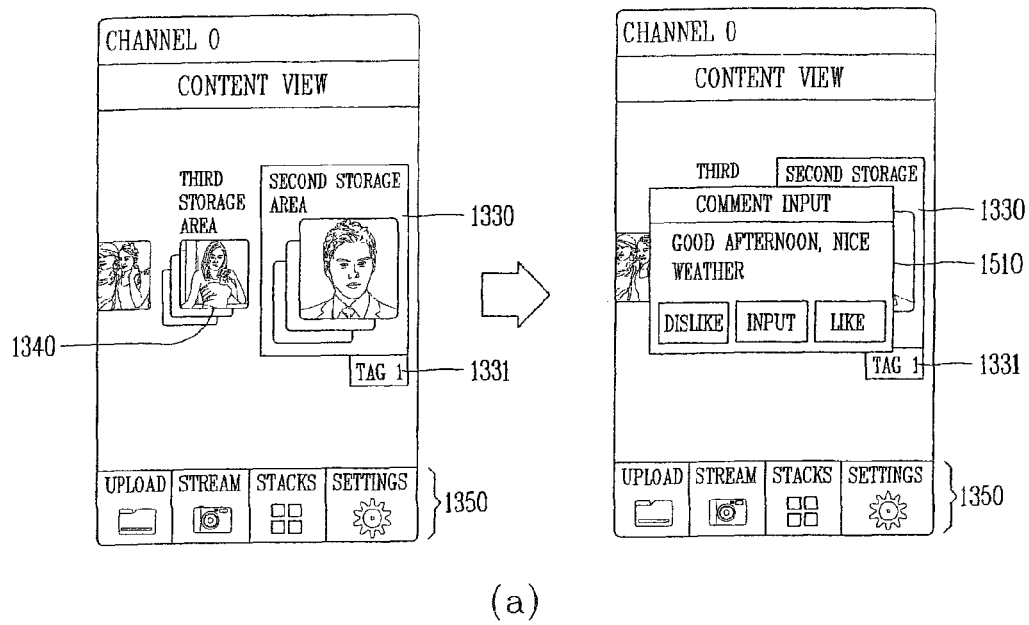
(a)
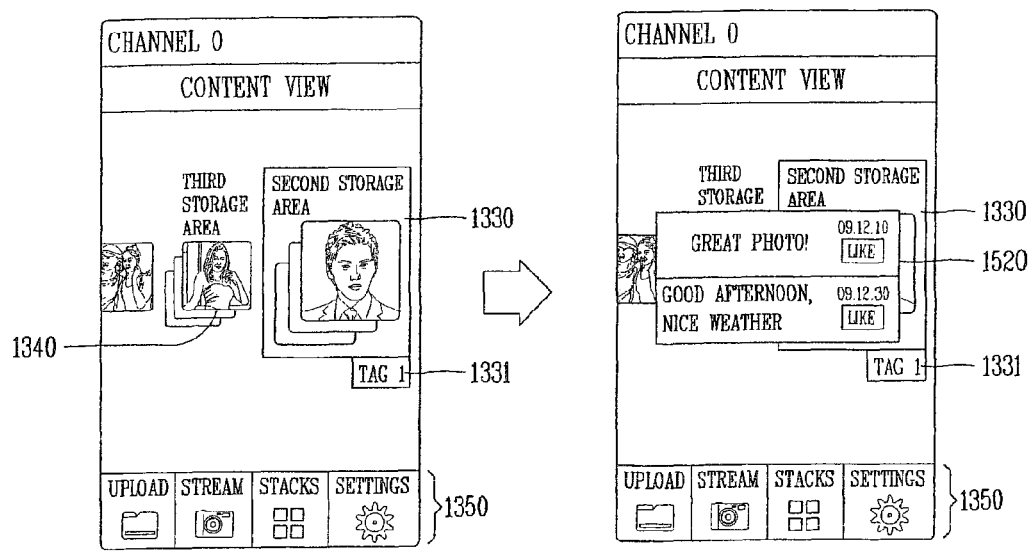
(b)

FIG. 16
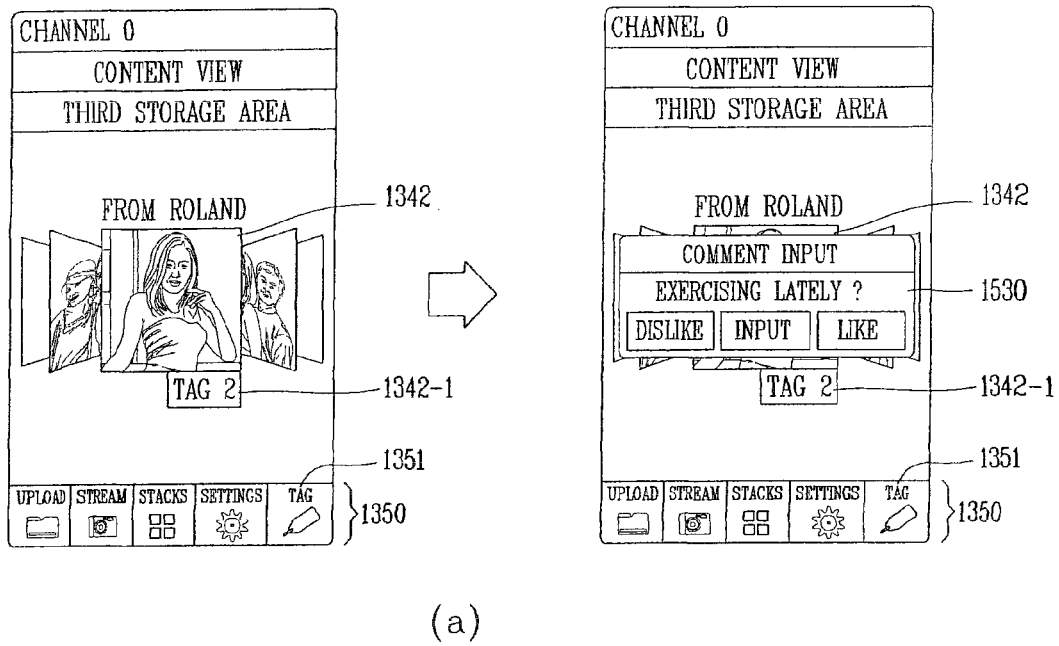
(a)
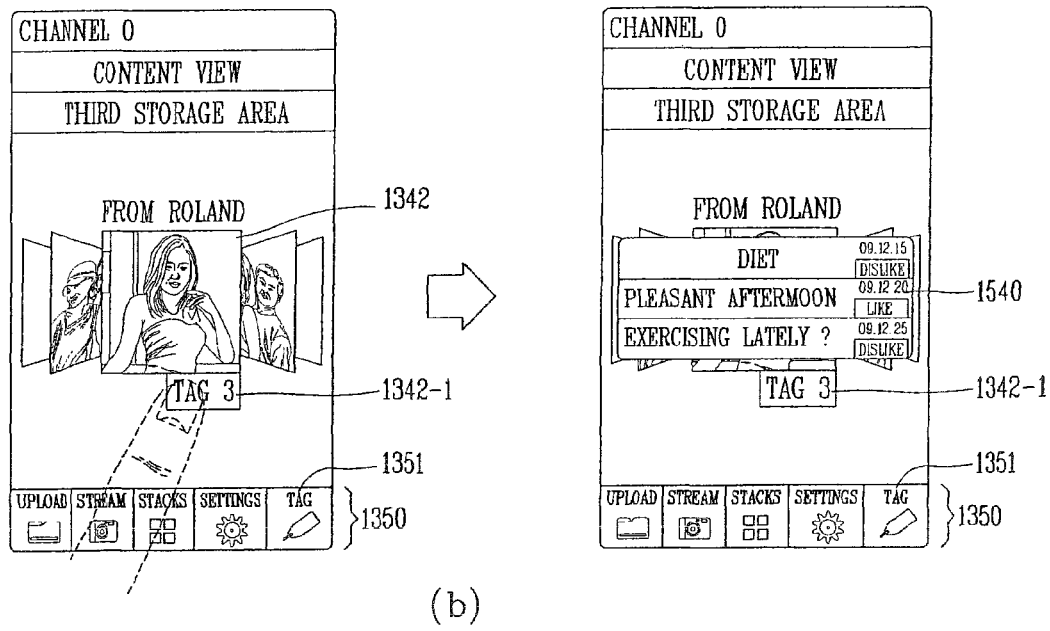
(b)

FIG. 17
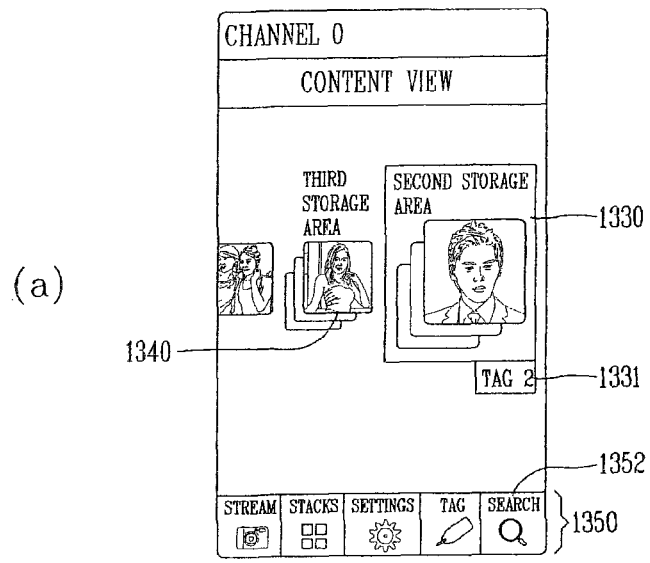
(a)
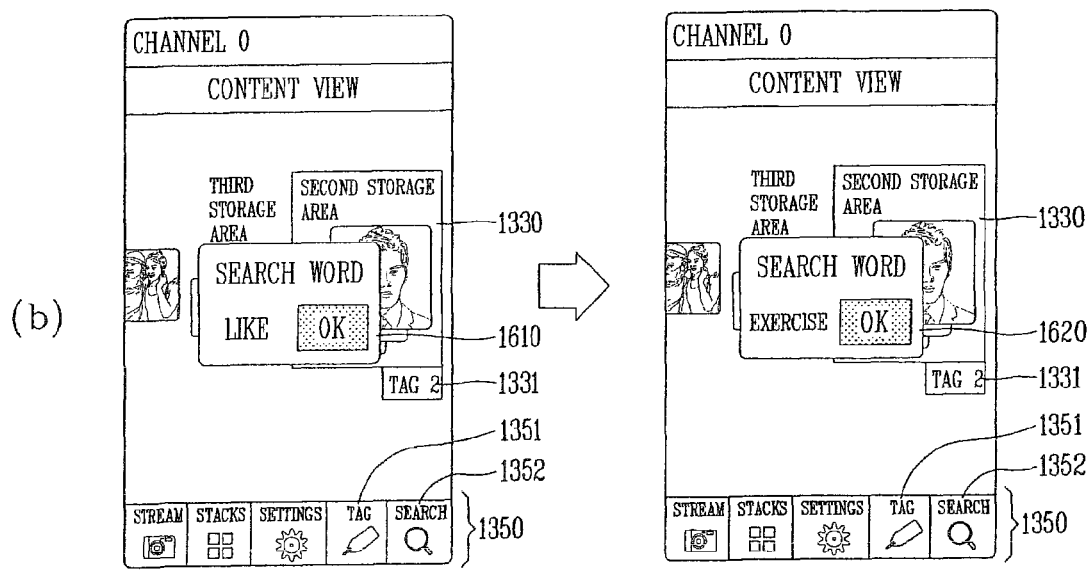
(b)

FIG. 18
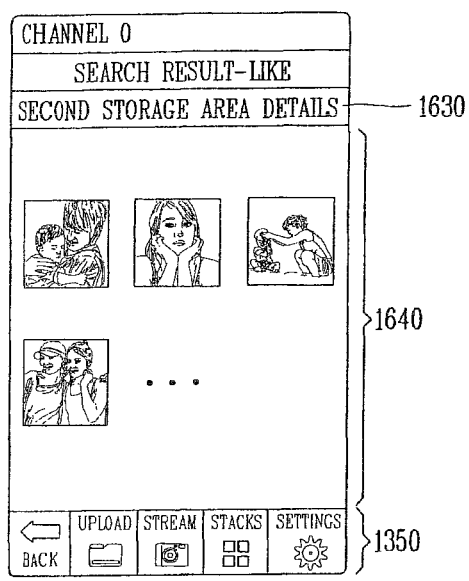
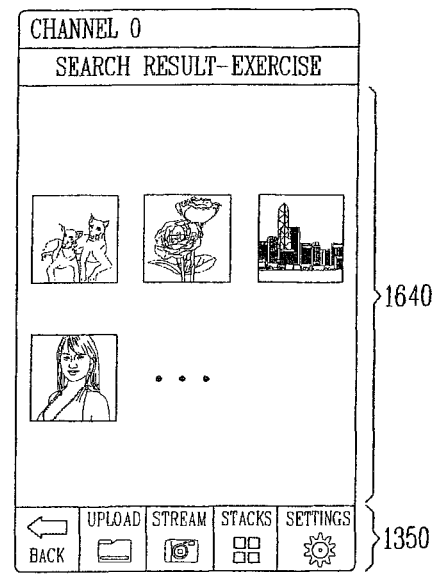
(a)	(b)

FIG. 19

| CHANNEL 0 |
| --- |
| ENVIRONMENT SETTING |
| 1. ALERT SETTING |
| 2. STORAGE AREA DESIGNATING |
| 3. STORAGE AREA EDITING |
| INPUT |

(a)

| CHANNEL 0 |
| --- |
| ENVIRONMENT SETTING-ALARM |
| CONTENTS STORAGE BOX SEARCH |
| 1. AUDIO CONTENTS ☑ |
| 2. PHOTO CONTENTS ☐ |
| 3. VIDEO CONTENTS ☐ |
| 4. DOCUMENT CONTENTS ☐ |
| 5. REAL TIME STREAM ☑ |
| INPUT |

(b)

| CHANNEL 0 |
| --- |
| ENVIRONMENT SETTING-STORAGE AREA DESIGNATING |
| 1. AUTOMATIC DESIGNATING ☐ (BASIC STORAGE AREA) |
| 2. DIRECT DESIGNATING ☐ |
| INPUT |

(c)

| CHANNEL 0 |
| --- |
| ENVIRONMENT SETTING-STORAGE AREA DESIGNATING |
| 1. FIRST STORAGE AREA ☐ |
| 2. SECOND STORAGE AREA ☐ |
| 3. THIRD STORAGE AREA ☐ |
| INPUT |

(d)

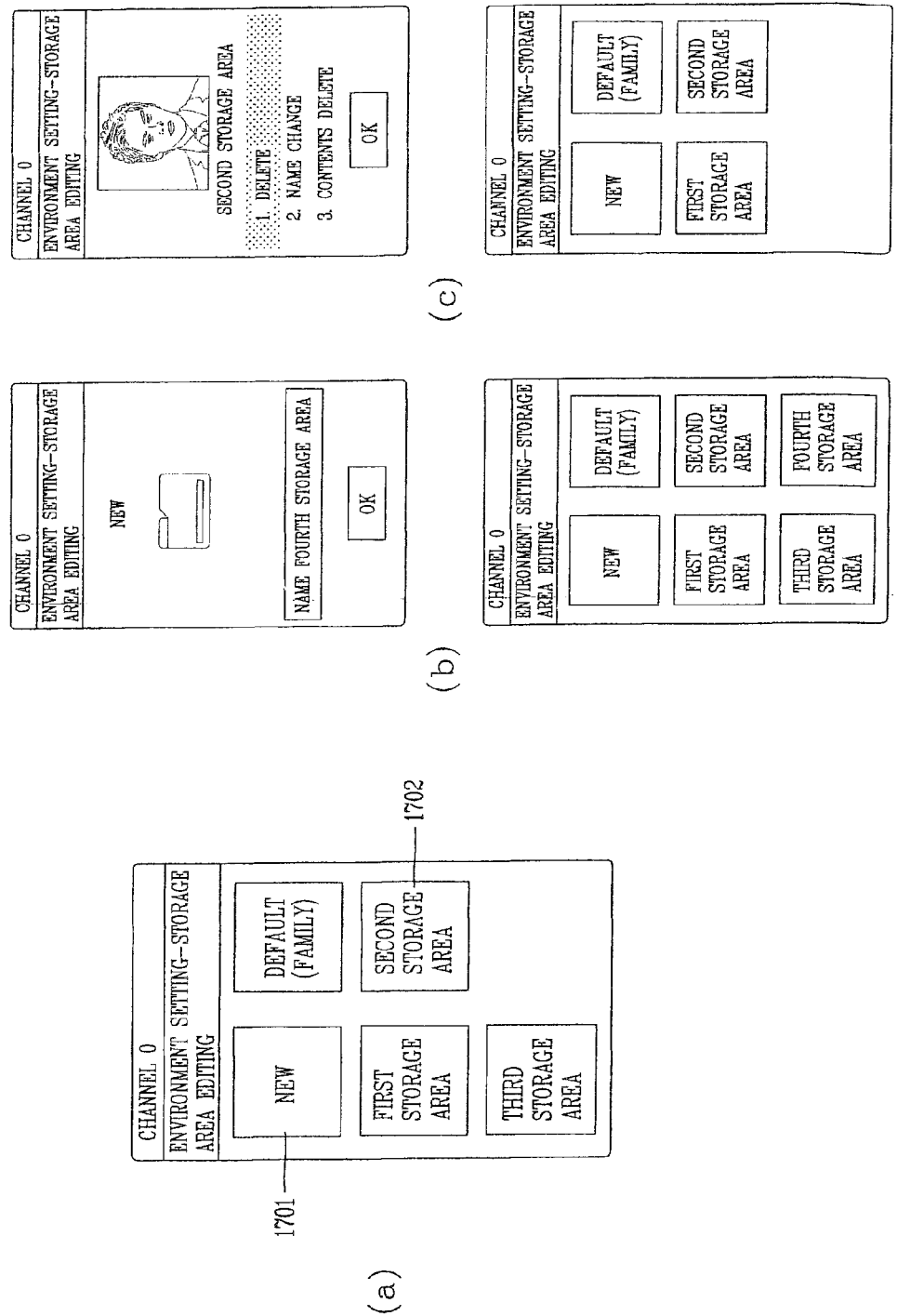

FIG. 21
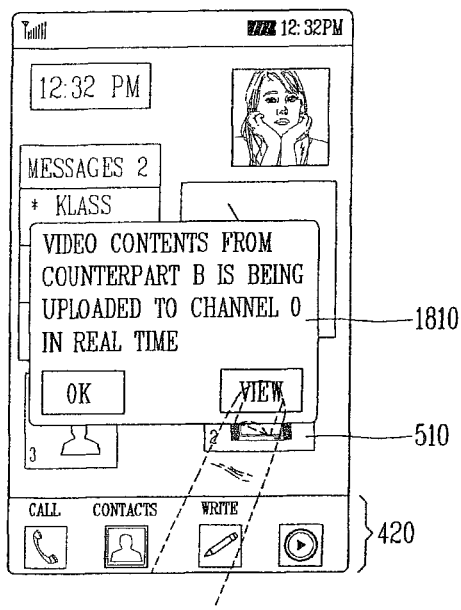
(a)
(b)
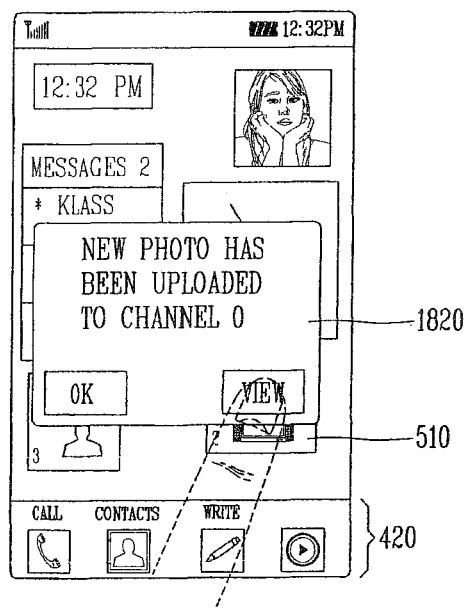
(c)
(d)

FIG. 23
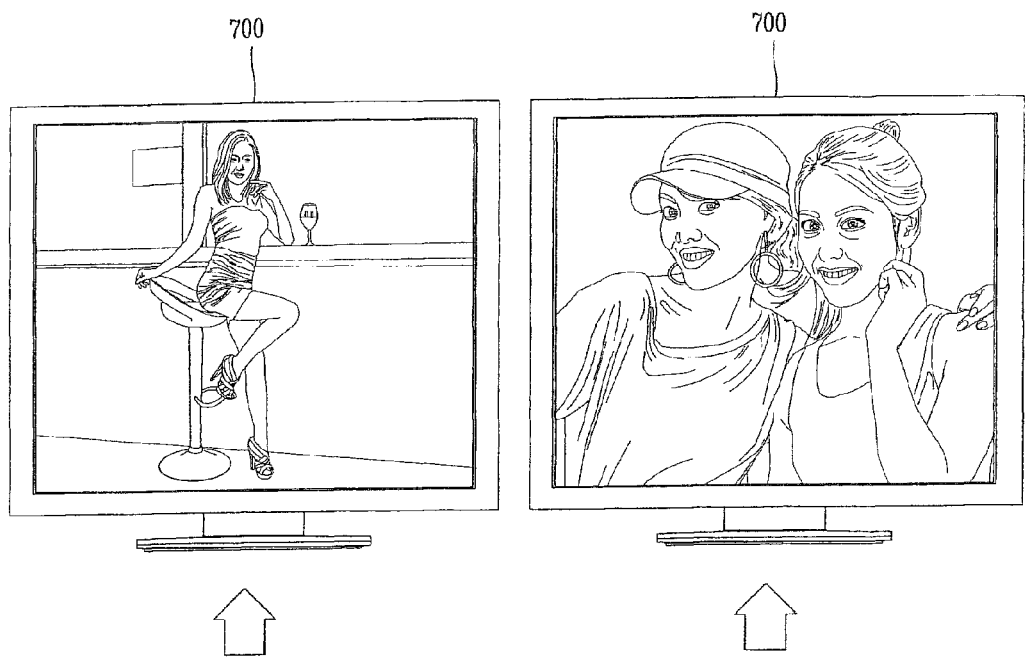
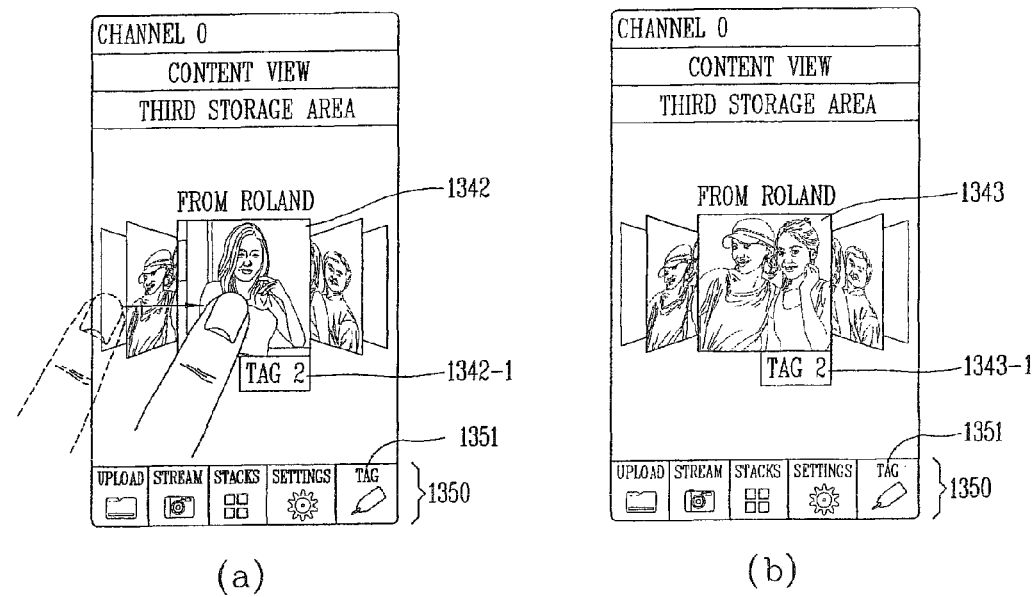
(a)  (b)

FIG. 32B
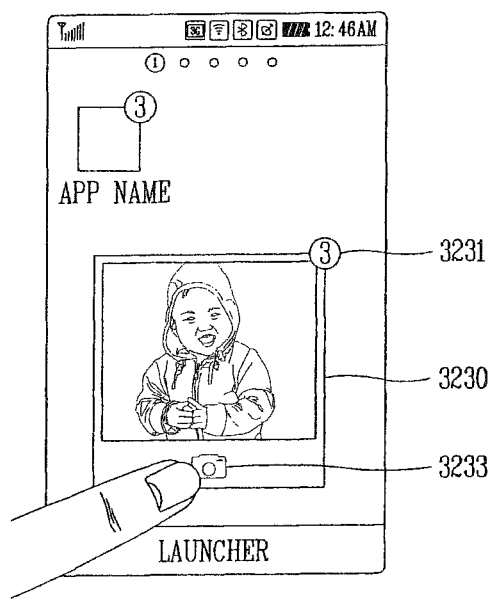
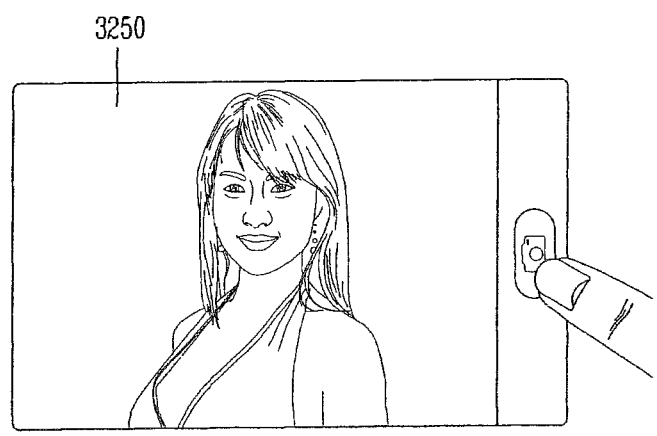

FIG. 33
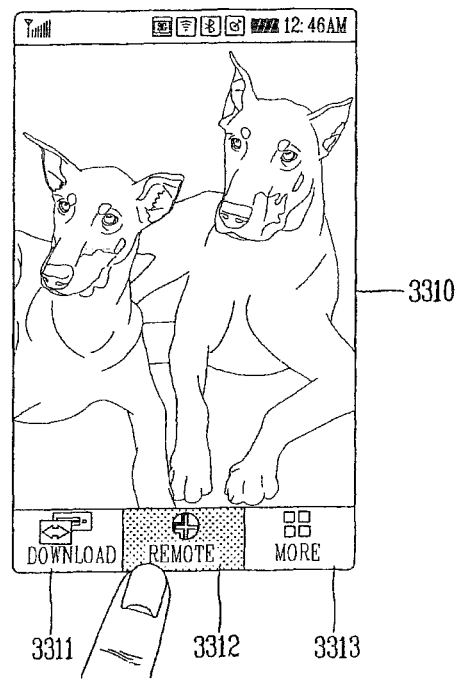
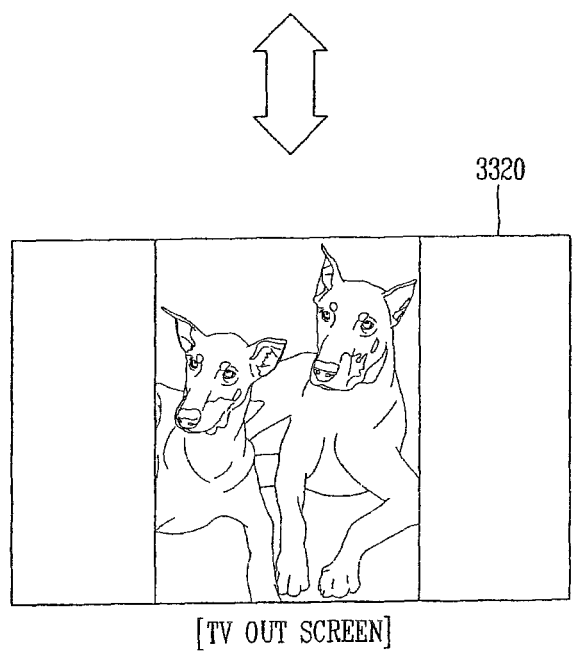
[TV OUT SCREEN]

FIG. 34
(a) 
(b) 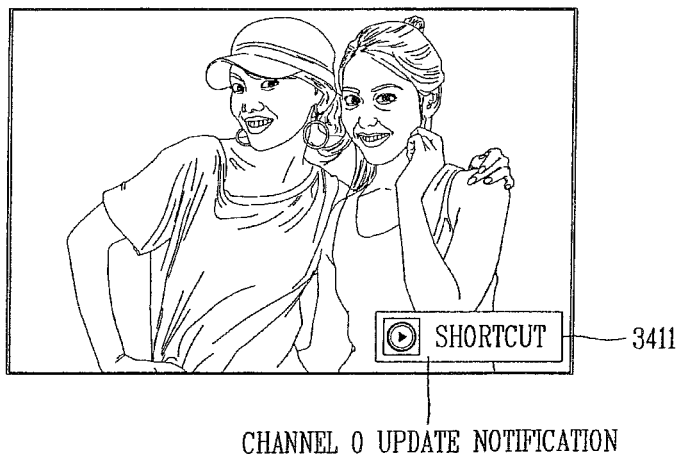
CHANNEL 0 UPDATE NOTIFICATION
(c) 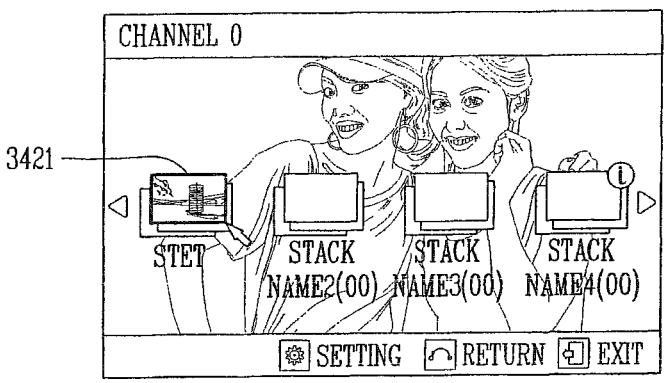

FIG. 35
(a)
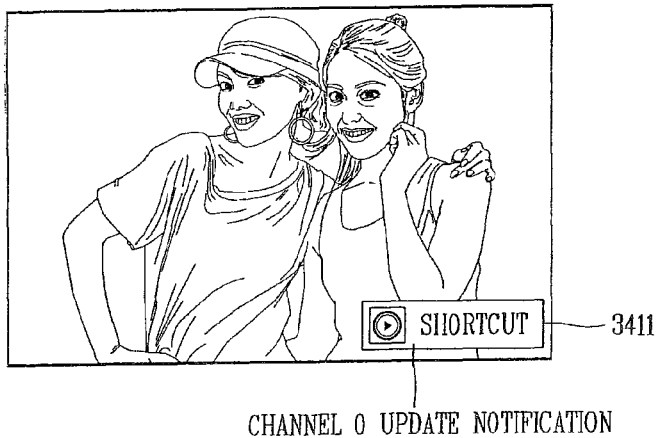
(b)
CHANNEL 0 UPDATE NOTIFICATION
(c)

FIG. 36
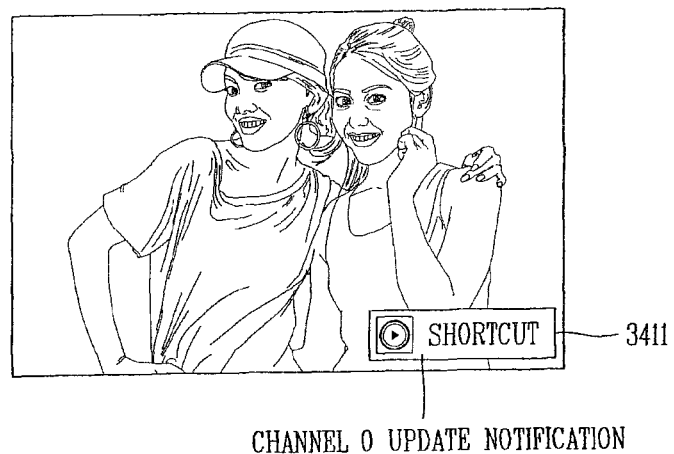
(a)
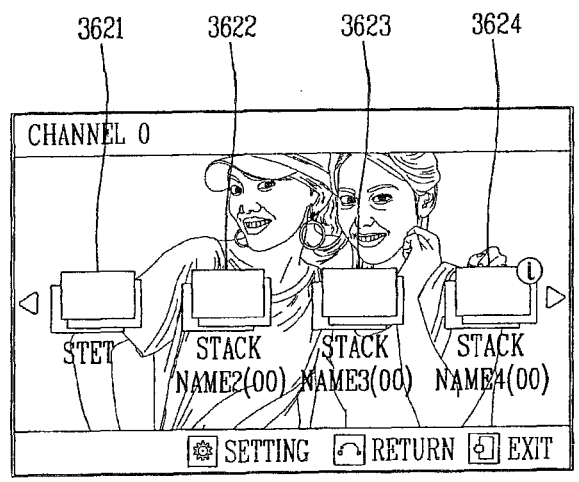
(b)
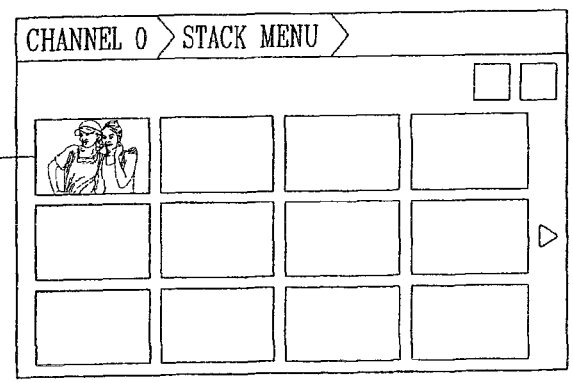
(c)

FIG. 38
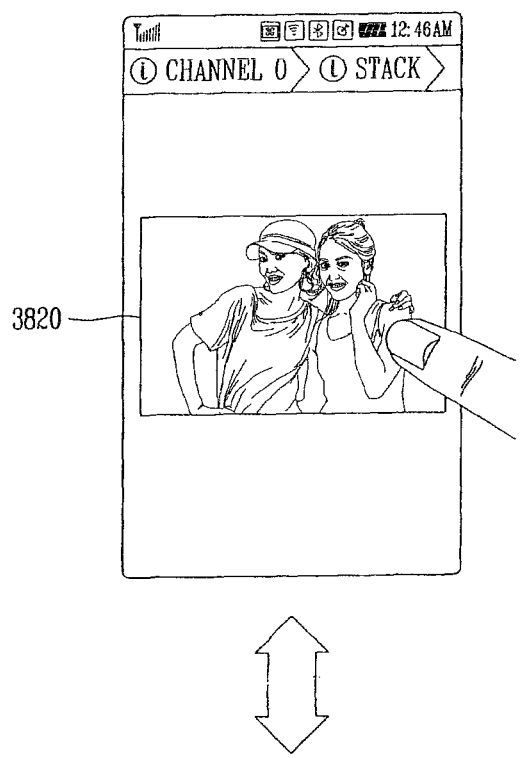
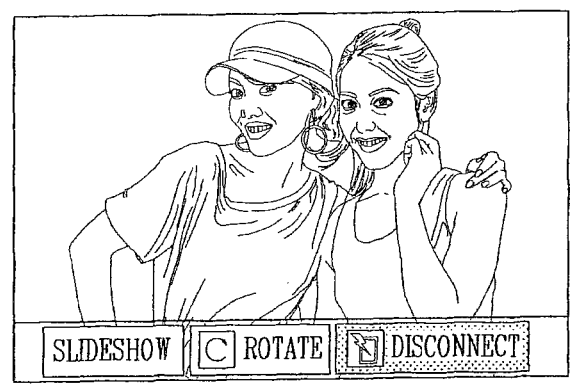

DISPLAY DEVICE AND METHOD FOR DISPLAYING CONTENTS ON THE SAME

CROSS-REFERENCE TO RELATED APPLICATION(S)

The present application claims priority to Korean Applications No. 10-2010-0001032 filed in Korea on Jan. 6, 2010 and No. 10-2010-0104271 filed in Korea on Oct. 25, 2010, the entire contents of which are hereby incorporated by reference in their entirety.

BACKGROUND

1. Field

A display device and a method for displaying contents on the same are disclosed herein.

2. Background

Display devices and methods for displaying contents on the same are known. However, they suffer from various disadvantages.

BRIEF DESCRIPTION OF THE DRAWINGS

The embodiments will be described in detail with reference to the following drawings in which like reference numerals refer to like elements, wherein:

FIGS. 5 and 6 illustrate display screens when receiving a command signal to access a content storage server from the mobile terminal according to an exemplary embodiment of the present disclosure;

FIG. 7 illustrates display screens when receiving a command signal to access the content storage server from a TV according to an exemplary embodiment of the present disclosure;

FIGS. 8 and 9 illustrate display screens during the process of uploading stored content to the content storage server when an upload item is selected according to an exemplary embodiment of the present disclosure;

FIG. 10 illustrates display screens displayed during designating a stream target content type and a storage area when a stream item is selected according to an exemplary embodiment of the present disclosure;

FIG. 11 illustrates display screens displayed during uploading a photo image input through a camera to the content storage server in real time when a photo stream is selected in FIG. 10;

FIG. 12 illustrates display screens displayed during uploading of a video input through the camera to the content storage server in real time when a video stream is selected according to an exemplary embodiment of the present disclosure;

FIGS. 13 and 14 illustrate display screens displayed during outputting of at least one storage area identifier or content stored in at least one storage area when a view item is selected according to an exemplary embodiment of the present disclosure;

FIGS. 15 and 16 illustrate display screens displayed during storing and setting a comment in a storage area or in content stored in the storage area according to an exemplary embodiment of the present disclosure;

FIGS. 17 and 18 illustrate display screens displayed during searching for a particular storage area or particular content by using a search word according to an exemplary embodiment of the present disclosure;

FIGS. 19 and 20 illustrate display screens displayed during setting an environment of a content providing service when an environment setting item is selected according to an exemplary embodiment of the present disclosure;

FIG. 21 illustrates display screens displayed during receiving a content upload notification message from a content storage server according to an exemplary embodiment of the present disclosure;

FIG. 23 illustrates display screens displayed during displaying of an accessed screen image of a content sharing service by using an external display device according to an exemplary embodiment of the present disclosure;

FIG. 33 illustrates display screens displayed during outputting contents being reproduced in the terminal to a TV according to an exemplary embodiment of the present disclosure;

FIG. 34 illustrates display screens during access to a particular channel in a display device according to an exemplary embodiment of the present disclosure;

FIG. 35 illustrates display screens during access to a particular channel in the display device according to another exemplary embodiment of the present disclosure;

FIG. 36 illustrates display screens during access to a particular channel in the display device according to yet another exemplary embodiment of the present disclosure;

FIG. 38 illustrates display screens during control of the display device by the mobile terminal according to an exemplary embodiment of the present disclosure.

DETAILED DESCRIPTION

Figure 1:
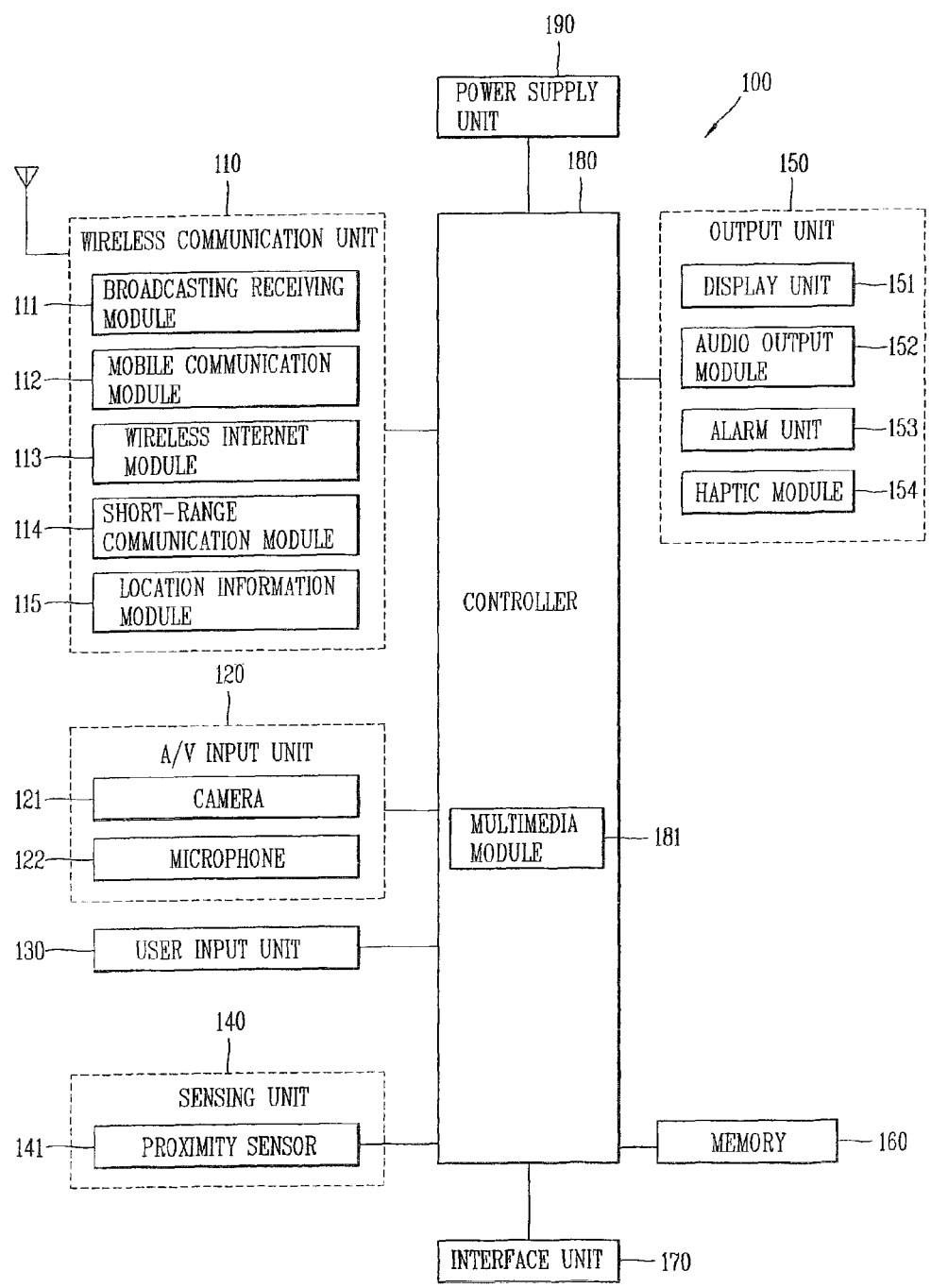
FIG. 1 is a schematic block diagram of a mobile terminal according to an exemplary embodiment of the present disclosure.

The present invention may be embodied in many different forms and may have various embodiments, of which particular ones will be illustrated in the drawings and will be described in detail. However, it should be understood that the following exemplifying description of the invention is not meant to restrict the invention to specific forms of the present disclosure but rather the present disclosure is meant to cover all modifications, similarities and alternatives which are included in the spirit and scope of the present disclosure.

The terminology used herein is for the purpose of describing particular embodiments only and is not intended to be limiting of the disclosure. Unless otherwise defined, all terms used herein have the same meaning as commonly understood by one of ordinary skill in the art to which this disclosure pertains, and should not be interpreted as having an excessively comprehensive meaning nor as having an excessively contracted meaning. If technical terms used herein is erroneous that fails to accurately express the technical idea of the present disclosure, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, steps, operations, elements, components, and/or groups thereof. Moreover, in the following description, usage of suffixes such as 'module', 'part' or 'unit' used for referring to elements is given merely to facilitate explanation of the present disclosure, without having any significant meaning by itself.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

The exemplary embodiments of the present disclosure will now be described with reference to the accompanying drawings, in which like numbers refer to like elements throughout. In describing the present application or patent, if a detailed explanation for a related known function or construction is considered to unnecessarily divert the gist of the present disclosure, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

Terminals may be categorized as a mobile terminal or a stationary terminal according to whether or not terminals are movable. In addition, mobile terminals may be categorized as a handheld terminal or a vehicle mount terminal according to whether or not users may directly carry the terminal around. As such functions become more diversified, the mobile terminal may support more complicated functions such as capturing images or video, reproducing music or video files, playing games, receiving broadcast signals, and the like. By comprehensively and collectively implementing such functions, the mobile terminal may be embodied in the form of a multimedia player or device.

In order to support and increase the functionality of mobile terminals, software and hardware improvements may be made as well as changes and improvements in the structural components which form the mobile terminal. The display device and the method of displaying contents as embodied and broadly disclosed herein may allow a plurality of terminals, registered to perform a content sharing service through a content storage server, to share content over the network. Moreover, the mobile terminal described in the present disclosure may include any type of terminals, such as mobile phones, smartphones, PDAs (Personal Digital Assistants), PMPs (Portable Multimedia Player), navigation devices, and the like, in which an application program can be installed.

FIG. 1 is a block diagram of a mobile terminal 100 according to an embodiment of the present disclosure. The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented. The elements of the mobile terminal will be described in detail hereinbelow.

The wireless communication unit 110 may typically include one or more components which allow radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 may receive broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Moreover, the broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 or another appropriate type of storage medium.

The mobile communication module 112 may transmit and/or receive radio signals to and/or from at least one of a base station (e.g., access point, Node B, etc.), an external terminal (e.q., other user devices), and a server (or other network entities). Such radio signals may include a voice call signal, a video call signal, or various types of data according to text and/or multimedia message transmission and/or reception.

The wireless Internet module 113 may support wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 may be a module that supports short range communications. Some examples of short-range communication technology include Bluetooth™, Radio Frequency IDentification (RFID), Infrared Data Association (IrDA), Ultra-WideBand (UWB), ZigBee™, and the like. The location information module 115 may be a module to check or acquire a location (or position) of the mobile terminal. A typical example of the location information module is a GPS (Global Positioning System).

With reference to FIG. 1, the A/V input unit 120 may be configured to receive an audio or video signal. The A/V input unit 120 may include a camera 121 (or other image capture device) and a microphone 122 (or other sound pick-up device). The camera 121 may process image data of still pictures or video obtained by an image capture device in a video capturing mode or an image capturing mode. The processed image frames may be displayed on a display unit 151 (or other visual output device). Moreover, the image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 when in the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that may detect changes in resistance, pressure, capacitance, etc., due to being contacted), a jog wheel, a jog switch, and the like.

The sensing unit 140 (or other detection means) may detect a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and may generate commands or signals to control the operation of the mobile terminal 100. For example, when the mobile terminal 100 is implemented as a slide type mobile phone, the sensing unit 140 may sense whether the slide phone is opened or closed. In addition, the sensing unit 140 may detect whether or not the power supply unit 190 supplies power or whether or not the interface unit 170 is coupled with an external device. The sensing unit 140 may include a proximity sensor 141.

The output unit 150 may be configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The display unit 151 may be a light emission display unit in that it may use a self-light emitting element. This is differentiated from an electronic-paper 155 (to be described).

The display unit 151 may be configured to be transparent or light-transmissive to allow viewing of the exterior, which may be called transparent displays. A typical transparent display may be, for example, a TOLED (Transparent Organic Light Emitting Diode) display, or the like. Through such configuration, the user may view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces. Meanwhile, when the display unit 151 and a sensor (referred to as a 'touch sensor', hereinafter) that detects a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance, or the like, generated at a particular portion of the display unit 151 into an electrical input signal. The touch sensor may be configured to detect the pressure when a touch is applied as well as the touched position and area.

When there is a touch input with respect to the touch sensor, a corresponding signal (signals) may be transmitted to a touch controller. The touch controller may process the signals and transmit corresponding data to the controller 180. Accordingly, the controller 180 may recognize which portion of the display unit 151 has been touched.

With reference to FIG. 1, the proximity sensor 141 may be disposed within or near the touch screen. The proximity sensor 141 may be a sensor that detects the presence or absence of an object relative to a certain detection surface or an object that exists nearby by using the force of electromagnetism or infrared rays without a physical contact. Thus, the proximity sensor 141 may have a considerably longer life span compared with a contact type sensor, and it may be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer may be detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch,' while recognition of actual contacting of the pointer on the touch screen will be called a 'contact touch.' In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) may be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

A haptic module 154 may generate various tactile effects the user may feel. A typical example of the tactile effects generated by the haptic module 154 may be vibration. The strength and pattern of the haptic module 154 may be controlled. For example, different vibrations may be combined to be outputted or sequentially outputted. Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user as well as to transfer the tactile effect through a direct contact. Two or more haptic modules 154 may be provided according to the configuration of the mobile terminal 100.

A projector module 155 is an element which may perform an image projection function by using the terminal 100. The projector module 155 may display an image, which may be the same as that displayed on the display unit 151 or at least a portion of which is different from that displayed on the display unit 151, on an external screen, or a wall according to a control signal from the controller 180.

In detail, the projector module 155 may include a light source that generates light (e.g., laser light) to output an image to the exterior, an image generation unit to generate an image to be output to the exterior by using the light generated by the light source, and a lens to magnify and output the image at a certain focal length. Also, the projector module 155 may include a device to regulate an image projection direction by mechanically moving the lens or the overall module.

The projector module 155 may be divided into a cathode ray tube (CRT) module, a liquid crystal display (LCD) module, a digital light processing (DLP) module, and the like, according to the types of elements of a display unit. In particular, the DLP module may employ a scheme in which an image generated as light generated from a light source is reflected to a digital micromirror device (DMD) chip is magnified and projected. The DLP module may be advantageous for reducing the size. Preferably, the projector module 155 may be provided on the side surface, front surface, or rear surface of the terminal 100 in a lengthwise direction. Of course, the projector module 155 may be provided on any portion of the mobile terminal as necessary.

The memory 160 may store software programs used to process and control operations performed by the controller 180, or may temporarily store data (e.g., a phonebook, messages, still images, video, etc.) that may be inputted or outputted. The memory 160 may store the frequency of use of each data (e.g., the frequency of use of respective phone numbers, respective messages, and respective multimedia). In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, or the like. Also, the mobile terminal 100 may be operated in relation to a web storage device that may perform the storage function of the memory 160 over the Internet.

The interface unit 170 may serve as an interface with every external device connected with the mobile terminal 100. For example, the external devices may transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as Identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 may typically control the general operations of the mobile terminal. For example, the controller 180 may perform controlling and processing associated with voice calls, data communications, video calls, and the like. The controller 180 may include a multimedia module 181 to reproduce multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively. Moreover, the power supply unit 190 may receive external power or internal power and may supply appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes may be implemented by a software application written in any suitable programming language. The software codes may be stored in the memory 160 and executed by the controller 180.

Figure 2:
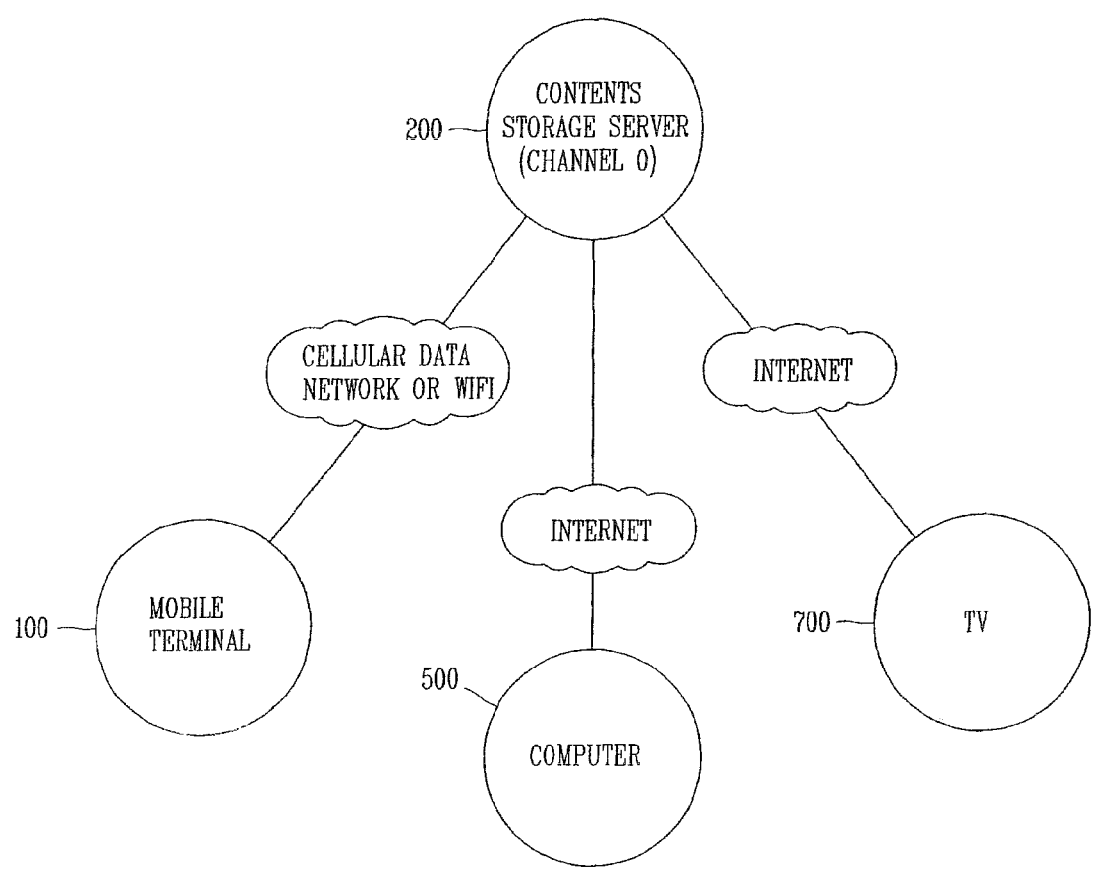
FIG. 2 illustrates a communication system for performing a content sharing service according to an exemplary embodiment of the present disclosure.

Hereinafter, a communication system for performing a content sharing service according to an exemplary embodiment of the present disclosure will now be described in detail with reference to FIG. 2. The communication system may include a content storage server 200 and a plurality of terminals 100, 500, and 700. Here, the plurality of devices 100, 500, and 700 may have been registered to perform a content sharing service through the content storage server 200. The content storage server 200 may receive contents from the plurality of devices 100, 500, and 700 and provide the received contents to a desired device among the plurality of devices 100, 500, and 700. Thus, the plurality of devices 100, 500, and 700 are able to share various contents through the content storage server 200.

In detail, the content storage server 200 may include a plurality of storage areas and the plurality of devices 100, 500, and 700 may upload contents to a desired storage area among the plurality of storage areas. For example, as illustrated, when a first device is a mobile terminal, the mobile terminal 100 may transmit and receive contents to and from the content storage server 200 through a wireless data network (e.g., WiFi, WiBro, WiMax, and the like). When a second terminal is the computer 500, the computer 500 may transmit and receive contents to and from the content storage server 200 through the Internet. When a third terminal is a TV having an Internet function, the TV may receive content from the content storage server 200 through the Internet or an IPTV network. Also, when content is received from any one of the plurality of devices 100, 500, and 700, the content storage server 200 may transmit a notification message indicating that new contents have been received to the other remaining devices. This will now be described in detail.

The mobile terminal 100 may generate a storage area for itself in the content storage server 200, and may set a particular folder or a stack in the generated storage area such that it may be shared with different devices, e.g., the computer 500 and the TV 700. The mobile terminal 100 may set the shared folder or stack as its particular channel, e.g., as channel 0.

Meanwhile, similarly, the computer 500 and the TV 700 may generate a storage area for themselves in the content storage server 200 and may set a particular folder (or stack) such that it may be shared with other devices in the generated storage area, respectively. The computer 500 and the TV 700 may set their shared folder (or stack) as a particular channel, e.g., channel 0. Then, the folder shared by the mobile terminal 100, the folder (or stack) shared by the computer 500, and the folder shared by the TV are present in the particular channel. When new contents are uploaded to the respective folders, the content storage server 200 may transmit a notification message indicating that the new contents have been received to the respective devices.

Figure 3:
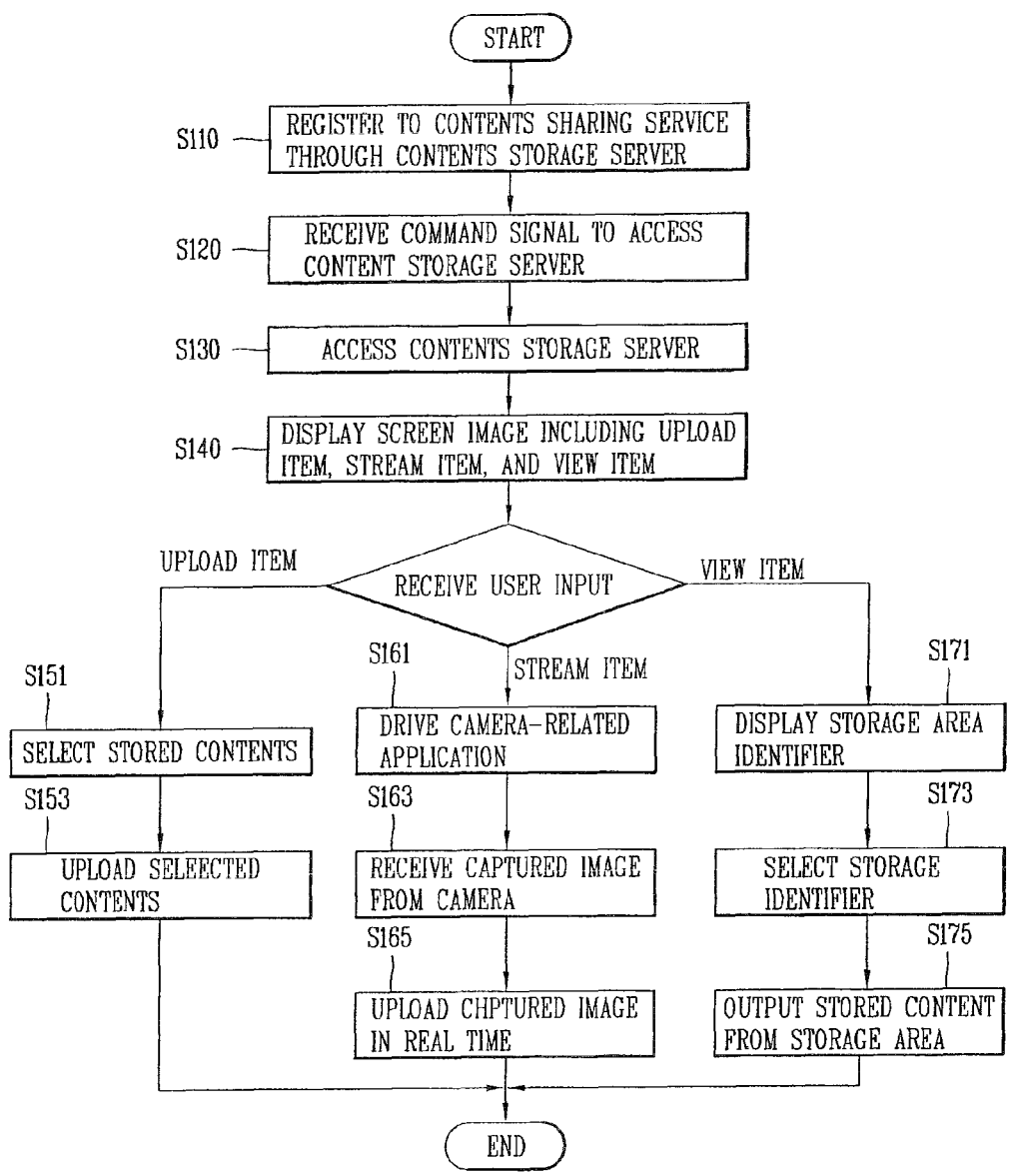
FIG. 3 is a flowchart illustrating a method for sharing content of the mobile terminal according to an exemplary embodiment of the present disclosure.

A method for content sharing according to an exemplary embodiment of the present disclosure will now be described with reference to the accompanying drawings. FIG. 3 is a flow chart illustrating a method for sharing contents of the mobile terminal according to an exemplary embodiment of the present invention.

As shown in FIG. 3, the terminal 100 may be registered to the content storage server 200 by using the wireless communication unit 110, in step S110. Here, a plurality of content storage servers may be provided and may include at least one storage area. For example, the terminal 100 may register to a content storage service with respect to each of the plurality of content storage servers, and may register to the content storage service with respect to each of the storage areas included in a single content storage server.

Thus, a plurality of terminals registered to the content sharing service through the content storage server 200 may perform the content sharing service through the content storage server 200. For example, the content sharing service may be discriminately registered according to group characteristics, and in this case, the group may include family, friends, company colleagues, a club, and the like.

Figure 4:
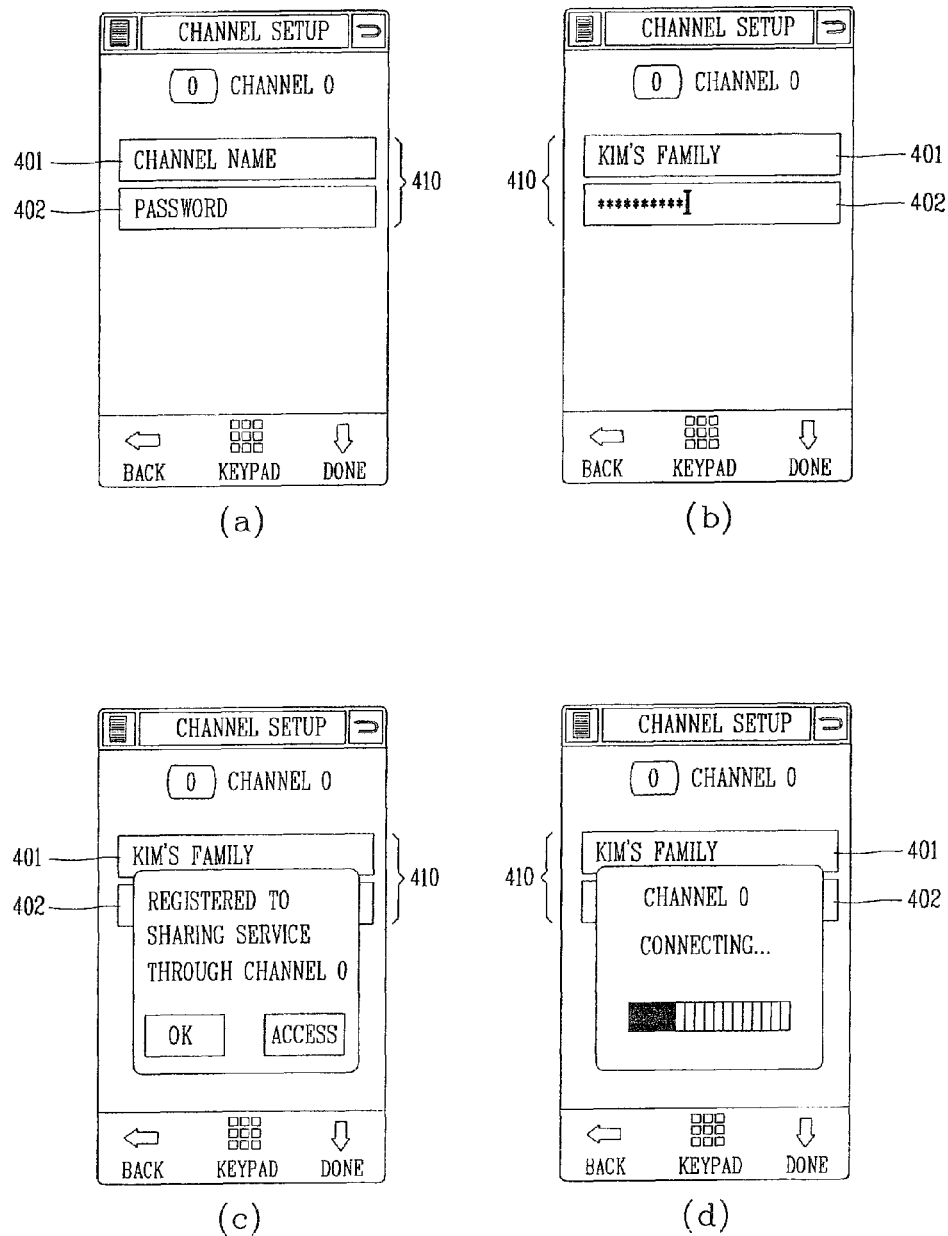
FIG. 4 illustrates display screens during the process of registering to the content sharing service according to an exemplary embodiment of the present disclosure.

Hereinafter, the process of registering to the content sharing service will now be described with reference to FIG. 4. For the sake of explanation, the content storage server 200 will be associated with channel 0. With reference to FIG. 4(a), when an operation for requesting a registration to the content sharing service is received from the user through the channel 0, the terminal 100 may display an input field 410 which may include a name input field 401 and a password input field 402. With reference to FIG. 4(b), the user may input the name and password associated with the channel 0 by manipulating a keypad (a virtual keypad in case of a front touch screen), and the input name and password for the channel 0 may be displayed on the name input field 401 and the password input field 402. For example, terminals registered to the content sharing service through the channel 0 may share the same name and the same password with respect to the channel 0.

With reference to FIG. 4(c), when the input name and password for the channel 0 are valid, the terminal may output a phrase indicating that the terminal has been registered to the content sharing service through the channel 0. In addition, when 'Access' is selected in FIG. 4(c), the terminal may attempt to access the channel 0 as shown in FIG. 4(d).

Referring again to FIG. 3, the terminal may receive a command signal to access the content storage server 200 through the user input unit 130, in step S120. In the input step S120, the command signal to access the content storage server 200 may be input by using at least one of a key, a key area, a widget, an icon, a channel, and a menu item corresponding to the input of the command signal to access the content storage server 200. Also, when the command signal to access the content storage server 200 is first received, the terminal 100 may perform the foregoing registration of step S110.

Hereinafter, the configuration of a screen when receiving a command signal to access the content storage server 200 from the mobile terminal will now be described with reference to FIGS. 5 and 6.

With reference to FIG. 5(a), the mobile terminal 100 may display a plurality of widgets including a widget 510 corresponding to channel 0 (referred to as a 'channel 0-widget,' hereinafter) in a standby state. When the channel 0-widget 510 is selected by the user, the command signal to access the channel 0 may be received.

With reference to FIG. 5(b), the mobile terminal may display a key area 530 (or icon) corresponding to the channel 0 (referred to as a 'channel 0-key area) in a standby state. When the channel 0-key area 530 is selected by the user, the mobile terminal 100 may receive the command signal to access the channel 0.

With reference to FIG. 5(c), the mobile terminal 100 may include the channel 0 (CH 0-Kim's Family) in a channel list which may include a plurality of broadcast channels. When 'CH 0-Kim's Family' 540' is selected from the channel list, the mobile terminal may receive the command signal to access the channel 0.

With reference to FIG. 5(d), when the mobile terminal 100 has registered to the content sharing service for each of the plurality of content storage servers, the mobile terminal 100 may display respective widgets for receiving the command signal to access the plurality of content storage servers. For example, the plurality of content storage servers may be represented as channel 0 and channel 100. The widget of the channel 0 may be illustrated as widget 510, and the widget of the channel 100 may be illustrated as widget 550. Thus, when the widget 510 of the channel 0 is selected, the mobile terminal may receive a command signal to access the channel 0. Likewise, when the widget 550 of the channel 100 is selected, the mobile terminal 100 may receive a command signal to access the channel 100.

Figure 6:
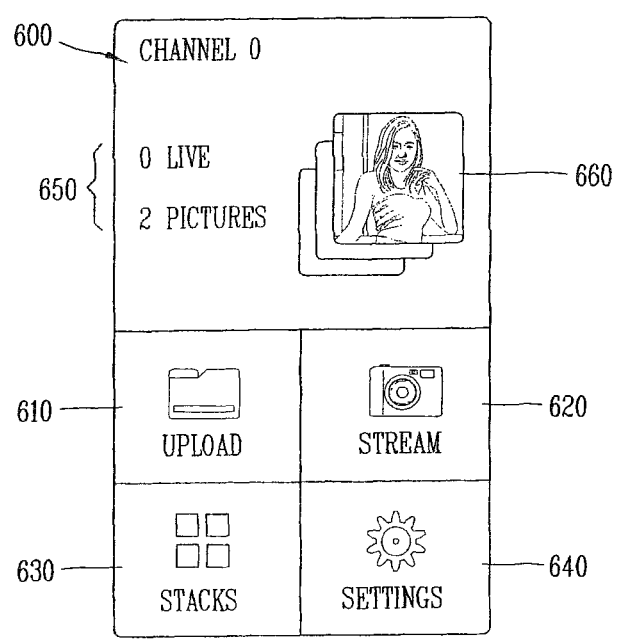

FIG. 6 shows a screen image when the channel 0 is accessed according to the input of the command signal to access the channel 0. For example, the accessed screen image 600 (homepage) for the channel 0 may include an upload item 610, a stream item 620, a view item (stacks) 630, an environment settings item 640, and information regarding newly uploaded contents (e.g., the number of unidentified contents by contents type 650 and newly uploaded image 660 may be included in the screen image). The accessed screen image 600 of the channel 0 will be described in detail later.

Hereinafter, the configuration of a screen image when receiving a command signal to access the content storage server from a digital TV will now be described with reference to FIG. 7. When the digital TV 700 receives a command signal to access the channel 0 from the user while a broadcast program is being output, as shown in FIG. 7(a), the digital TV 700 may display a plurality of broadcast-related tiles on the screen, as shown in FIG. 7(b). In this case, the broadcast output screen image may be displayed on the entire display area, and the brightness of the broadcast output screen image may be adjusted to be below a certain reference (in order to clearly display the broadcast-related tiles). Alternatively, the broadcast output screen image may be displayed within a tile configured to display the broadcast.

The digital TV 700 may display information corresponding to a broadcast-related tile selected by the user on the screen. For example, the broadcast-related tile may include an EPG-related tile, a DVR-related tile, a bookmark-related tile, or a channel 0-related tile 710.

When the channel 0-related tile 710 is selected, the digital TV 700 may display an accessed screen image 600 of the channel 0, as shown in FIG. 7(c). In this case, the accessed screen image 600 of the channel 0 may be displayed on the entire display area or may be displayed within the magnified channel 0-related tile 710. Meanwhile, even when the channel 0-related tile 710 is not selected, the digital TV 700 may display the accessed screen image 600 of the channel 0 within the channel 0-related tile 710 in the state as shown in FIG. 7(b).

Referring again to FIG. 3, the terminal may access the content storage server 200 by using the wireless communication unit 110 under the control of the controller 180, in step S130. In particular, the terminal 100 may access (or may be connected to) the content storage server 200 through the wireless Internet module 113. The terminal 100 may store the IP address of the content storage server 200 in the memory 160 and access the content storage server 200 by retrieving the stored IP address.

In addition, when the terminal 100 accesses at least one storage area included in the content storage server 200, the terminal 100 may store the IP address corresponding to each of the storage areas included in the content storage server 200. The terminal may subsequently access a corresponding storage area by using the stored IP address corresponding to the desired storage area.

When the terminal 100 accesses the content storage server 200, in step S130, the terminal may display a screen image (referred to as an 'accessed screen image,' or 'home page' hereinafter) including at least one of an upload item, a stream item, and a view item under the control of the controller 180, in step S140. Here, the accessed screen image may be provided by the accessed content storage server 200.

Hereinafter, the respective cases in which the upload item, the stream item, and the view item are selected from the accessed screen image will now be described. First, the case in which the upload item is selected is described. When the upload item is selected from the displayed accessed screen image of the terminal 100, in the display step S140, the user may select contents to be uploaded to the content storage server 200 among the contents stored in the memory 160, in step S151.

The terminal 100 may upload the contents selected in the selecting step S151 to the content storage server 200 by using the wireless communication unit 110 under the control of the controller 180, in step S153. Moreover, the accessed screen image may display notification information indicating that new contents have been uploaded from the terminal 100.

Hereinafter, the process of uploading contents to the content storage server when an upload item is selected will be described with reference to FIGS. 8 and 9. With reference to FIG. 8(*a*), when an upload item is selected from the accessed screen image of channel 0 (e.g., when item 610 is selected in FIG. 6), the terminal 100 may display a content type list 810 with respect to the contents previously stored in the memory 160. For example, the content type list 810 may include audio contents, photo contents, video contents, document contents, and the like.

With reference to FIG. 8(*b*), when the photo contents is selected from the contents type list 810, as illustrated in FIG. 8(*a*), photo images 821 to 829 stored in the memory 160 may be displayed in the form of thumbnails. The user may select the photo images 822, 827, and 829 desired for uploading from among the displayed photo images.

Examples of thumbnails and methods of using the same are disclosed in application Ser. No. 12/651,730, which is hereby incorporated by reference.

Alternatively, as shown in FIG. 8(*c*), when the photo contents is selected from the contents type list 810, as illustrated in FIG. 8(*a*), the terminal 100 may display the photo images 821 to 829 stored in the memory 160 in the form of a scroll bar on a lower end portion of the screen. When the user selects a desired photo image from among the images displayed on the scroll bar, the terminal 100 may magnify and display the selected photo image on the main screen. In FIG. 8(*c*), the photo images to be uploaded (i.e., upload target photo images) among the photo images 821 to 829 displayed in the scroll bar may be discriminately selected and displayed.

With the upload target photo images selected, as shown in FIG. 8(*b*) or 8(*c*), when an upload command signal is received, the terminal 100 may upload the selected upload target photo images to the content storage server 200. The content storage server 200 may include a basic storage area 'family', 'first storage area,' 'second storage area,' and 'third storage area,' and the selected upload target photo images may be uploaded to any of the available storage areas. Meanwhile, with reference to FIG. 9(*a*), the terminal 100 may upload the selected upload target photo images to a default basic storage area, for example, the 'Family' storage area. The default storage area may be used when a particular storage has not been designated.

When the uploading to the basic storage area 'Family' has completed, the accessed screen may display the respective identifiers 920 to 950 of all the storage areas, and may discriminately display the basic storage area 'Family' to which the new photo images have been uploaded. For example, the identifier of the basic storage area 'Family' may include a thicker frame or border, magnified to be displayed, or may be displayed in a different color. Also, the number of newly uploaded photo images (new 3) may be displayed together with the identifier of the basic storage area 'Family.'

Figure 9:
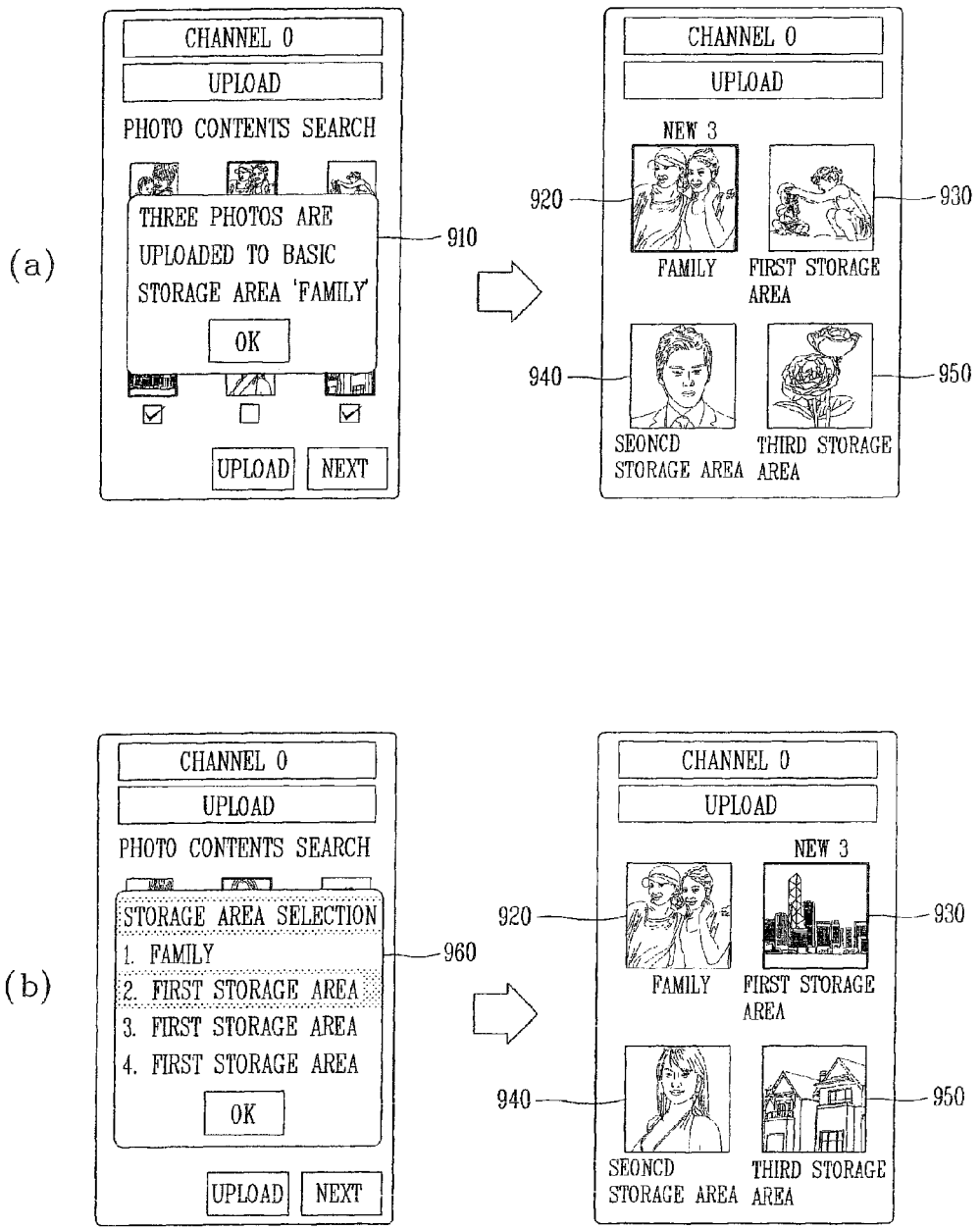

With reference to FIG. 9(*b*), the terminal 100 may display a storage area list 960 and upload the selected upload target photo images to the selected storage area (e.g., first storage area) selected from the storage area list 960. When the upload to the first storage area is complete, the accessed screen may display the identifiers 920 to 950 which correspond to the respective storage areas, and may discriminately display the first storage area to which the new photo images have been uploaded.

The case in which the stream item is selected will now be described. When the stream item 620 is selected from the displayed accessed screen image 600, in the display step S140, the terminal 100 may drive the camera-related application under the control of the controller 180, in step S161. The terminal 100 may activate the camera 121 in order to capture an image according to the execution of the camera-related application.

The terminal 100 may receive an image from the activated camera 121, in step S163, and upload the received image in real time through the wireless communication unit 110 under the control of the controller 180, in step S165. The image to be uploaded may include a still image (or a photo stream) and/or a video stream.

Hereinafter, the configuration of a screen image when designating a stream target content type and a storage area when the stream item is selected will now be described with reference to FIG. 10. When the stream item (item 620 as shown in FIG. 6) is selected from the accessed screen image in the mobile terminal, the user may select a real-time upload target content type, as shown in FIG. 10(*a*). For example, the real-time upload target content type may include a photo stream or a video stream.

The user may select a storage area to which the real-time upload target content is to be uploaded, as shown in FIG. 10(*b*). For example, when the basic storage area 'Family' and the first to third storage areas are included in the content storage server 200, the user may select a storage area to which the real time upload target content is to be uploaded from among the four storage areas. Meanwhile, when the user does not select storage area, the basic storage area 'Family' may be selected as a storage area as a default to which the real time upload target contents is to be uploaded.

Hereinafter, the process of uploading a photo image input through the camera to the content storage server in real-time when the photo stream item, as shown in FIG. 10(*a*), is selected will be described. For the sake of brevity, it is assumed that the photo image is uploaded to the basic storage area 'Family' in real time. With reference to FIG. 11(*a*), when the photo stream as shown in FIG. 10(*a*) is selected, the terminal may display a preview screen image 1110 corresponding to the image input through the camera 121. With reference to FIG. 11(*b*), when an image capture key 1120 as shown in FIG. 11(*a*) is selected, the terminal may capture an image through the camera 121 and upload the captured image to the basic storage area 'Family' of the content storage server 200.

Hereinafter, the process of uploading a video input through the camera to the content storage server in real-time when the video stream, as shown in FIG. 10(a), is selected will be described. With reference to FIG. 12(a), when the video stream is selected in FIG. 10(a), the terminal 100 may display a preview screen image 1210 of the image input through the camera 121.

With reference to FIG. 12(b), when an image capture key 1220 as shown in FIG. 11(a) is selected, the terminal 100 may capture a video through the camera 121 and upload the captured video to the basic storage area 'Family' of the content storage server 200 in real-time. Namely, the terminal may be configured to upload the video to the content storage server 200 as soon as the video capture is complete, or may stream the video to the server once the video capture begins.

An indicator 1250 indicating the decree of transmission (e.g., progress indicator) to the content storage server 200 and a video capture time (e.g., 00:00:30) may be displayed on one area of the screen. In addition, the content storage server 200 may transmit notification information indicating that the photo stream or the video stream has been uploaded from the terminal 100 to the other terminal(s) which are registered to share content with the terminal 100 through the content sharing service.

Next, the case in which the view item is selected will now be described. When the view item is selected from the displayed accessed screen image in the display step S140, the terminal 100 may display identifiers that correspond to at least one of the storage areas (referred to as 'storage area identifiers,' herein) included in the content storage server 200 under the control of the controller 180, in step S171. When the user selects a particular storage area identifier from among the one or more displayed storage area identifiers, in step S173, the terminal 100 may output content stored in the storage area corresponding to the selected storage area identifier, in step S175.

Hereinafter, the process of outputting contents stored on at least one storage area identifier or at least one storage area when the view item is selected will be described. First, with reference to FIG. 13(a), when the view item is selected from the accessed screen image (view item 630 as shown in FIG. 6 is selected), the terminal 100 may display respective storage area identifiers corresponding to the plurality of storage areas included in the content storage server 200.

For example, the basic storage area 'Family' 1310, the first storage area 1320, the second storage area 1330, and the third storage area 1340 may he included in the plurality of storage areas. The number of contents newly uploaded to the respective areas may be displayed at the respective storage area identifiers, and recently updated contents may also be displayed. Here, the newly uploaded contents may refer to unidentified contents or contents which have been uploaded within a certain time period (today, the last week, etc.).

Figure 13:
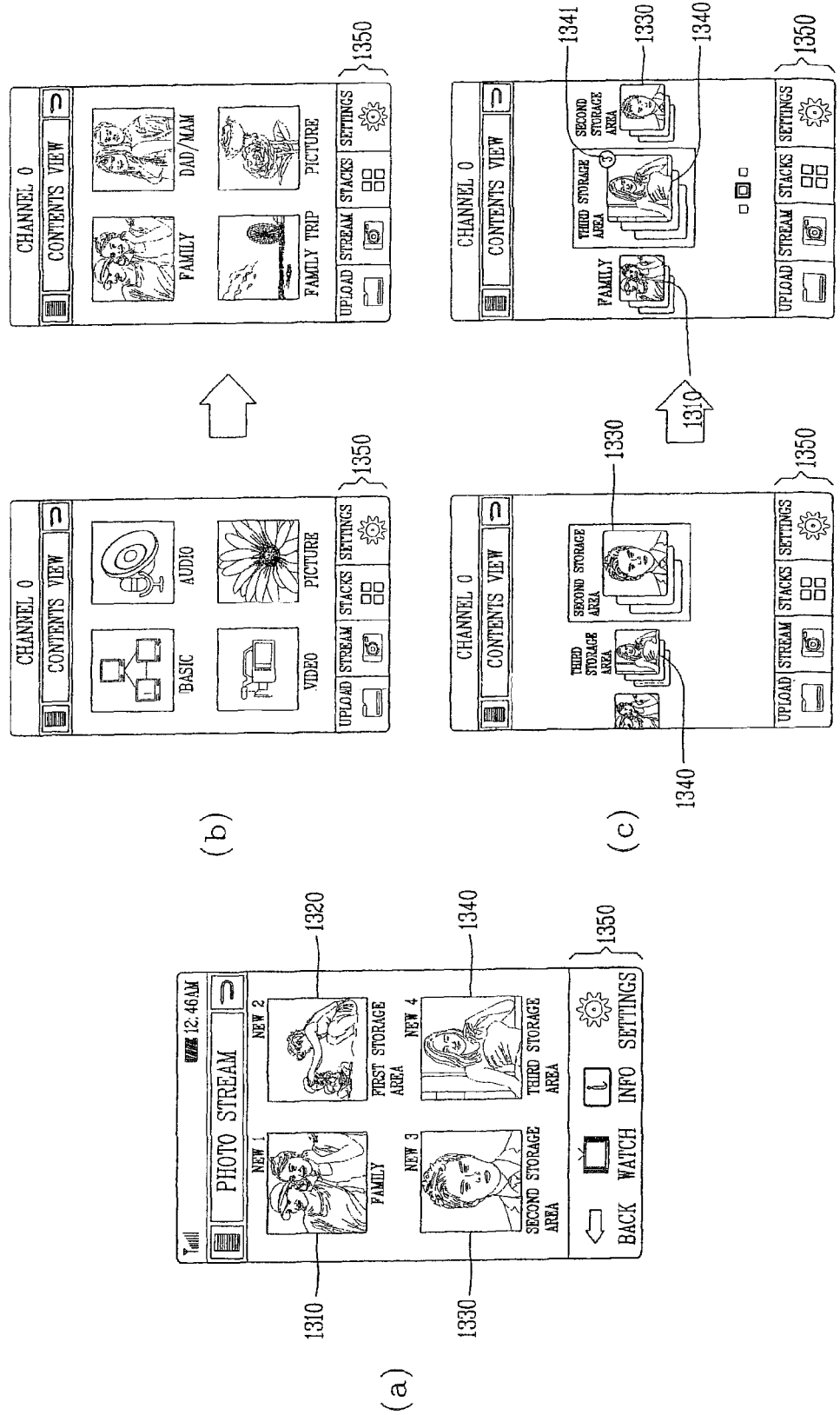

With reference to FIG. 13(b), the content storage server 200 may include the basic storage area, the audio storage area, the video storage area, and the photo storage area based on the content type, or may include a family storage area, mom/dad storage area, family trip storage area, and picture storage area based on identification information (a name, a family relationship, a nickname, and the like) of the users of the terminals registered to mutually perform the content sharing service.

With reference to FIG. 13(c), when the view item is selected from the accessed screen image (view item 630 as shown in FIG. 6 is selected), the terminal 100 may display a second storage area identifier 1330 which may have been the most recently viewed content at the center of the screen. The other remaining storage area identifiers may be displayed next to the second storage area identifier 1330 and may have a smaller size than that of the second storage area identifier 1330.

Alternatively, when the view item is selected (view item 630 as shown in FIG. 6 is selected), the terminal 100 may display the third storage area identifier 1330 having the most recently uploaded contents at the center of the screen. The other remaining storage area identifiers may be displayed adjacent to the third storage area identifier 1340 such that they have a smaller size than that of the third storage. area identifier 1340.

For example, the most recently updated contents (e.g., photo images) may be displayed in each of the storage area identifiers 1310 to 1340. Also, the storage area identifiers 1310 to 1340 may be scrolled to correspond to an input operation (e.g., a touch-and-drag input, a touch input, a direction key manipulation, a motion input such as tilt, tapping, etc.) from the user.

When the third storage area identifier 1340 is selected from the display screen as shown in FIGS. 13(a) to 13(c), the terminal 100 may display the most recently uploaded contents 1342 in the third storage area at the center of screen. The other remaining contents stored in the third storage area may be arranged to be displayed behind the contents 1342, as shown in FIG. 14(a). Moreover, the contents stored in the third storage area may be scrolled to correspond to an input operation from the user. Also, when any one of the contents illustrated in FIG. 14(a) is selected by the user, the terminal 100 may display the selected content on the entire display area, as shown in FIG. 14(b). Moreover, the contents stored in the third storage area may be scrolled on the display screen of FIG. 14(b) for viewing thereon.

According to the present exemplary embodiment, the terminal 100, which may be connected to the content storage server 200, may receive a comment for a particular storage area or contents stored in the particular storage area from the user through the user input unit 130. Also, the input comment may be stored to be set in the corresponding storage area or corresponding contents.

FIGS. 15 and 16 illustrate display screens when storing and setting a comment in a particular storage area according to an exemplary embodiment of the present disclosure. With reference to FIG. 15(a), when the second storage area 1330 is selected as a comment input target storage area, the terminal 100 may display a comment input window 1510. Then, the user may input a command (e.g., "good afternoon, nice weather") desired to be set in the second storage area 1330. Moreover, an input preference (e.g., Like or Dislike) with respect to the second storage area 1330 may be set using the comment input window 1510. For example, when a tag area 1331 is selected in a state in which a particular storage area identifier is displayed at the center of the screen or when a visual queue is displayed at the particular storage area identifier, the particular storage area may be selected as the comment input target storage area. With reference to FIG. 15(b), when the user selects a tag indicator 1331 added to the second storage area identifier 1330, the terminal 100 may display a display window 1520 which may include all the comments stored and set in the second storage area 1330.

FIGS. 16(a) and 16(b) show display screens when storing and setting a comment within a particular content storage area. With reference to FIG. 16(a), when a particular content 1342 stored in the third storage area is selected as comment input target content, the terminal 100 may display a comment input window 1530. Then, the user may input a comment (e.g., "Exercising lately?") to be set in the particular content 1342 through the comment input window 1530. Moreover, a preference (e.g., Like or Dislike) with respect to the particular contents may be set using the comment input window 1530. With reference to FIG. 16(*b*), when the user selects a tag indicator 1342-1 added to the particular content 1342, the terminal 100 may display a display window 1540 which may include every comment set in the particular content 1342.

According to the present exemplary embodiment, the terminal 100 connected to the content storage server 200 may receive a search word to search for a storage area or content through the user input unit 130. Moreover, a comment stored and set associated with a storage area or content may also be searched. This feature will now be described in detail with reference to FIGS. 17 and 18.

With reference to FIG. 17(*a*), when a search icon 1352 is selected from among command icons displayed in a command bar 1350 included in the accessed screen image, the terminal 100 may display a search word input window 1610 or 1620 to receive a search word, as shown in FIG. 17(*b*). For example, in FIG. 17(*b*), a preference (Like or Dislike) may be received as a search word by using the search word input window. Alternatively, a recommended search word may be received and displayed as a search word in the search word input window 1620. Moreover, a search word may be entered manually using the user input interface.

FIGS. 18(*a*) and 18(*b*) show accessed screen images that show search results according to this embodiment. With reference to FIG. 18(*a*), the search result in which the preference 'Like' is associated with contents stored in the second storage area 1330 may be displayed on the accessed screen image. The search result may display an identification 1630 of the storage area as well as the searched contents 1640. With reference to FIG. 18(*b*), the search result of the contents in which the input word 'Exercise' is included in a comment, as shown in FIG. 17(*b*), may be displayed on the accessed screen. The displayed search result may include the contents 1640.

The process of setting an environment setting of a content providing service will now be described with reference to FIG. 19. With reference to FIG. 19(*a*), when an environment setting item (item 640 as shown in FIG. 6) is selected from the accessed screen image 600, the terminal 100 may display a list of setting target items. For example, the setting target items may include an alert setting (notification setting), a storage area designation setting, a storage area editing setting, and the like.

With reference to FIG. 19(*b*), when the notification setting is selected from the list as illustrated in FIG. 19(*a*), the terminal 100 may display a list of content types (a contents type list). Each content type may be set or selected to receive a notification of events associated with the selected content type. Thus, when a content of the selected content type is uploaded, for example, the content storage server 200 may transmit a content upload notification information to the terminal 100. For example, if audio contents and a real-time stream is selected, as shown in FIG. 19(*b*), when the audio contents and real time stream data are uploaded, the content storage server 200 may transmit notification information to the terminal 100.

With reference to FIG. 19(*c*), when the storage area designation is selected from the list as illustrated in FIG. 19(*a*), the user may select one of automatic designation and direct designation. For example, when the automatic designation is selected, the basic storage area may be set as a default storage area. In this case, contents uploaded to the content storage server 200 from the terminal 100 may be uploaded to the basic storage area as a default. Alternatively, when the direct designation is selected, with reference to FIG. 19(*d*), the terminal 100 may display a list of available storage areas to be selected as the selected storage area. Thereafter, contents uploaded to the content storage server 200 may be uploaded to the selected storage area.

With reference to FIG. 20(*a*), when the storage area editing is selected from the list as illustrated in FIG. 19(*a*), the terminal 100 may display respective identifiers for the pre-set storage areas (e.g., default, first, second, and third storage areas) as well as an identifier (new) to create a new storage area. With reference to FIG. 20(*b*), when the identifier 1701 (new) is selected, the terminal 100 may display a screen image to generate a new storage area. For example, the new storage area may be named 'fourth storage area' and the terminal 100 may display an identifier associated with the fourth storage area on the screen together with the existing storage area identifiers.

With reference to FIG. 20(*c*), when the identifier 1702 (second storage area) is selected, the terminal 100 may display a screen image to edit various settings associated with the second storage area. For example, an editing item or options may include deletion of the storage area, change the name of a storage area, deletion of particular contents stored in a storage area, and the like. When the deletion option is selected among the editing items, the second storage identifier 1702 may be deleted from the screen, as shown in FIG. 20(*c*).

According to the present exemplary embodiment, when new content is uploaded to the content storage server 200, the terminal 100 may receive a message to notify that new content has been uploaded from the content storage server 200. This feature will now be described in detail with reference to FIG. 21. For the sake of brevity, the content storage server 200 may be expressed as channel 0.

The terminal 100 may receive a message indicating that video contents are being uploaded to the channel 0 in real time, as shown in FIG. 21(*a*). The message may be displayed in a pop-up window which may be displayed over the image displayed on the display screen. Moreover, the video content may be uploaded from a remote terminal, e.g., a counterpart B over the channel 0. The message may include information regarding the storage area to which the video contents is being uploaded in real time. The message may include icons or buttons (e.g., "OK" and "View"). When the 'View' option is selected, as shown in FIG. 21(*a*), the terminal 100 may access the channel 0 and display the video contents being uploaded from the counterpart B in real-time, as shown in FIG. 21(*b*).

Also, as shown in FIG. 21(*c*), the terminal 100 may receive a message over channel 0 indicating that another type of new content, such as a photo, has been uploaded to the channel 0. Information regarding the storage area in which the new content has been stored may be included in the message. When the 'View' option is selected as shown in FIG. 21(*c*), the terminal 100 may access the channel 0 and display the newly uploaded content, as shown in FIG. 21(*d*).

According to the present exemplary embodiment, a plurality of terminals may participate in the content controlling operation with respect to a particular storage area or content on a content storage server 200. For example, when the terminal 100 performs a content controlling operation for a particular storage area on the content storage server 200 (which is performed when one of the upload item, stream, or view item is selected), the terminal 100 may exchange messages with another terminal which may also have access to the particular storage area. The messages may be exchanged through an instant messaging service. Here, both terminals may have been previously registered to gain access to the content sharing service through the content storage server 200.

Figure 22:
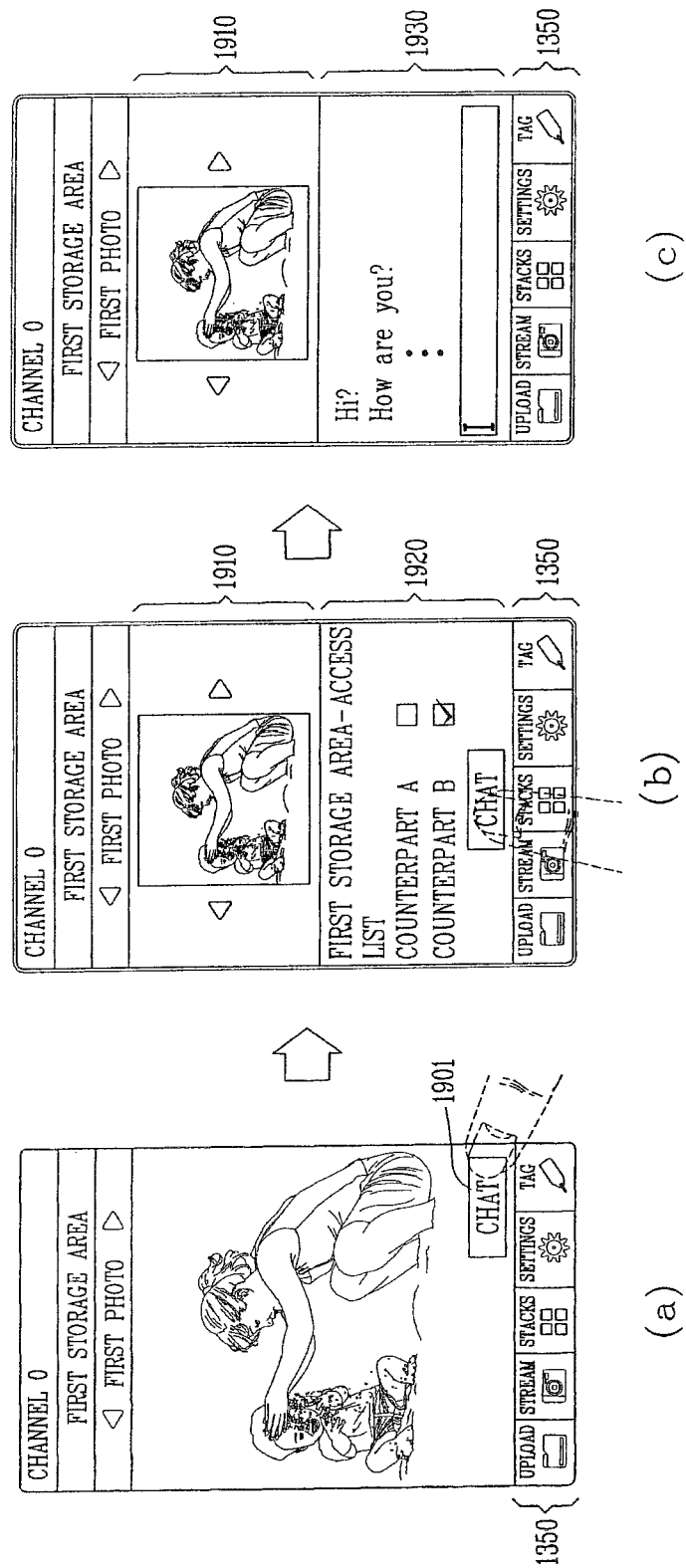
FIG. 22 illustrates display screens during a conversation with a different terminal which uses the same storage area according to an exemplary embodiment of the present disclosure.

With reference to FIG. 22(*a*), while the terminal is connected to the content storage server 200, the user may view a photo image stored in the second storage area and may select a chat icon 1901. With reference to FIG. 22(*b*), when the user selects the chat icon 1901, as shown in FIG. 22(*a*), the terminal 100 may display the photo image stored in the second storage area in the first area 1910 of the screen, and display a list of counterpart terminals having authority to perform contents controlling operation in the second area 1920 of the screen. Thus, as shown in FIG. 22(*c*), the terminal 100 may initiate conversation using an instant messaging service with a particular counterpart terminal selected from the list of the counterpart terminals.

According to the present exemplary embodiment, the terminal 100 may display an accessed screen image on an external display device For example, with reference to FIG. 23, a photo image stored in a third storage area may be displayed on the terminal 100 may also be displayed on an external display device 700. In addition, the terminal 100 may control the display of the accessed screen on the external display device 700. For example, with reference to FIG. 23, when a display command signal is received to move from a first photo image 1342 to a second photo image 1343 on the terminal 100, the displayed image on the external display device 700 may be changed from the first photo image 1342 to the second photo image 1343. Moreover, contents stored in the content storage server 200 may be deleted after a prescribed period of time. The time period may begin when the content is first uploaded.

Figure 24:
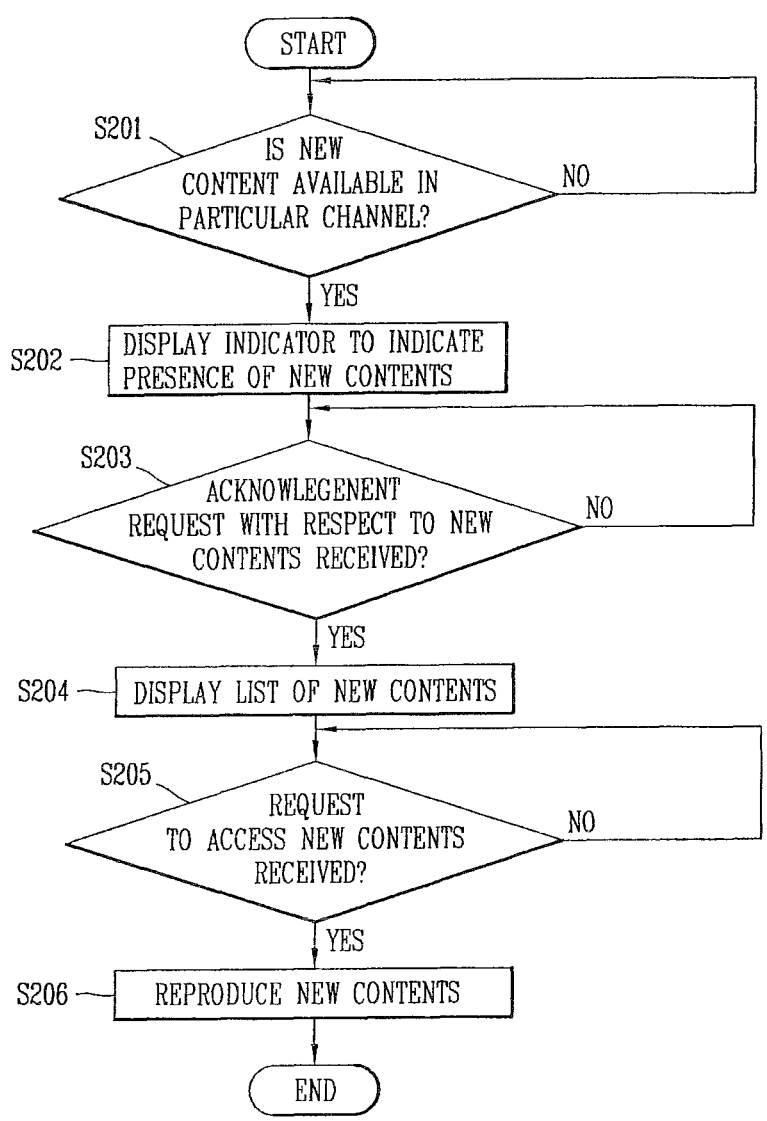
FIG. 24 is a flow chart illustrating a method of accessing new contents according to an exemplary embodiment of the present disclosure.

FIG. 24 is a flowchart illustrating a method of accessing new contents according to an exemplary embodiment of the present disclosure. Referring to FIG. 24, a device (e.g., the terminal 100, the computer 500, or the TV 700) may determine whether new content is available in a particular channel, in step S201. The particular channel may be channel 0 as mentioned above. The particular channel may be a folder (or stack) shared by the mobile terminal 100, a folder shared by the computer 500, or a folder shared by the TV. The presence of the new contents may be determined by checking whether a notification message has been received, e.g., a push message, or an SMS from the content storage server 200.

When new content is present in the particular channel, an indicator that indicates the presence of the new content may be displayed on the display unit, in step S202. When an acknowledgement or confirmation request with respect to the new content is received, in step S203, a list of the new contents may be displayed, in step S204. The list of new contents may be displayed together with a list which has been reproduced, e.g., previously listed contents. The list of the new contents may be grouped by a type of content. Alternatively, the list of the new contents may be grouped by date. Here, the list of the new contents may be displayed in the form of a folder (or stack) or as an image of the new contents, for example, as a thumbnail. Also, the list of the new contents may reproduce the new contents to have a small size. Thereafter, when a request to access the new contents is received, in step S205, the new contents may be reproduced and displayed on the display unit, in step S206.

Figure 25:
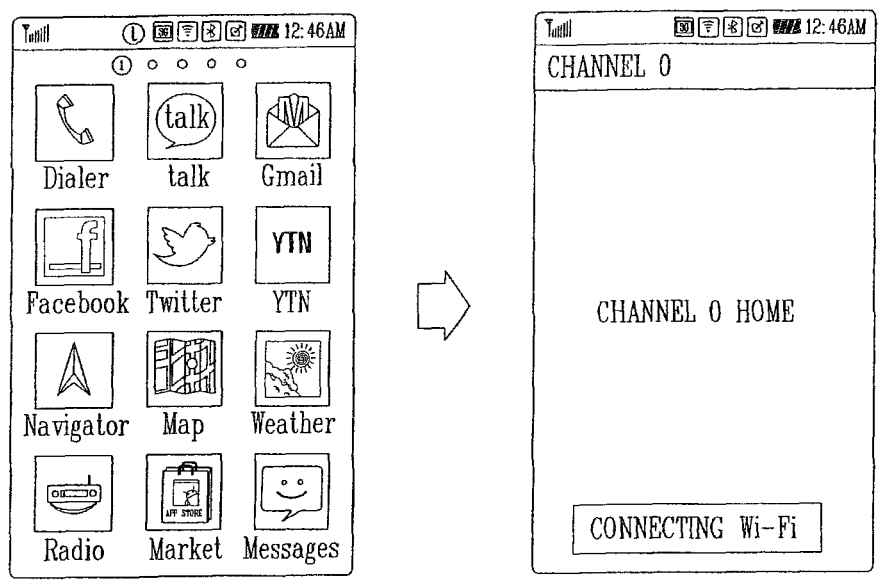
FIG. 25 illustrates display screens displayed during access of a particular channel from the terminal according to an exemplary embodiment of the present disclosure.

FIG. 25 illustrates display screens to access a particular channel from the terminal according to an exemplary embodiment of the present disclosure. As can be understood from FIG. 25, a network connection may allow the mobile terminal 100 to access a particular channel (e.g., the channel 0). For example, the mobile terminal 100 may be connected to an access point (AP) through a Wi-Fi connection. The connection through Wi-Fi may be automatically established when the channel 0 is accessed, for example, when the homepage for the channel 0 is opened. Once the connection to the AP is established, the mobile terminal 100 may be connected to the content storage server 200.

Meanwhile, the terminal 100 may map the particular channel to the channel 0 in a particular broadcast. For example, the terminal 100 may map the particular channel to the channel 0 in any one of a DMB (Digital Multimedia Broadcasting), a DVB-H (Digital Video Broadcasting-Handheld), Media-Flow, an IP-TV (Internet Protocol-TV). To this end, the terminal may display an indicator as described above, and when a confirmation request associated with the new contents is received, the terminal 100 may activate the function of the DMB, DVB-H, Mediaflow, and IP-TV to display the particular channel as the channel. Accordingly, the user may view the particular channel as if he is viewing a general broadcast.

Figure 26:
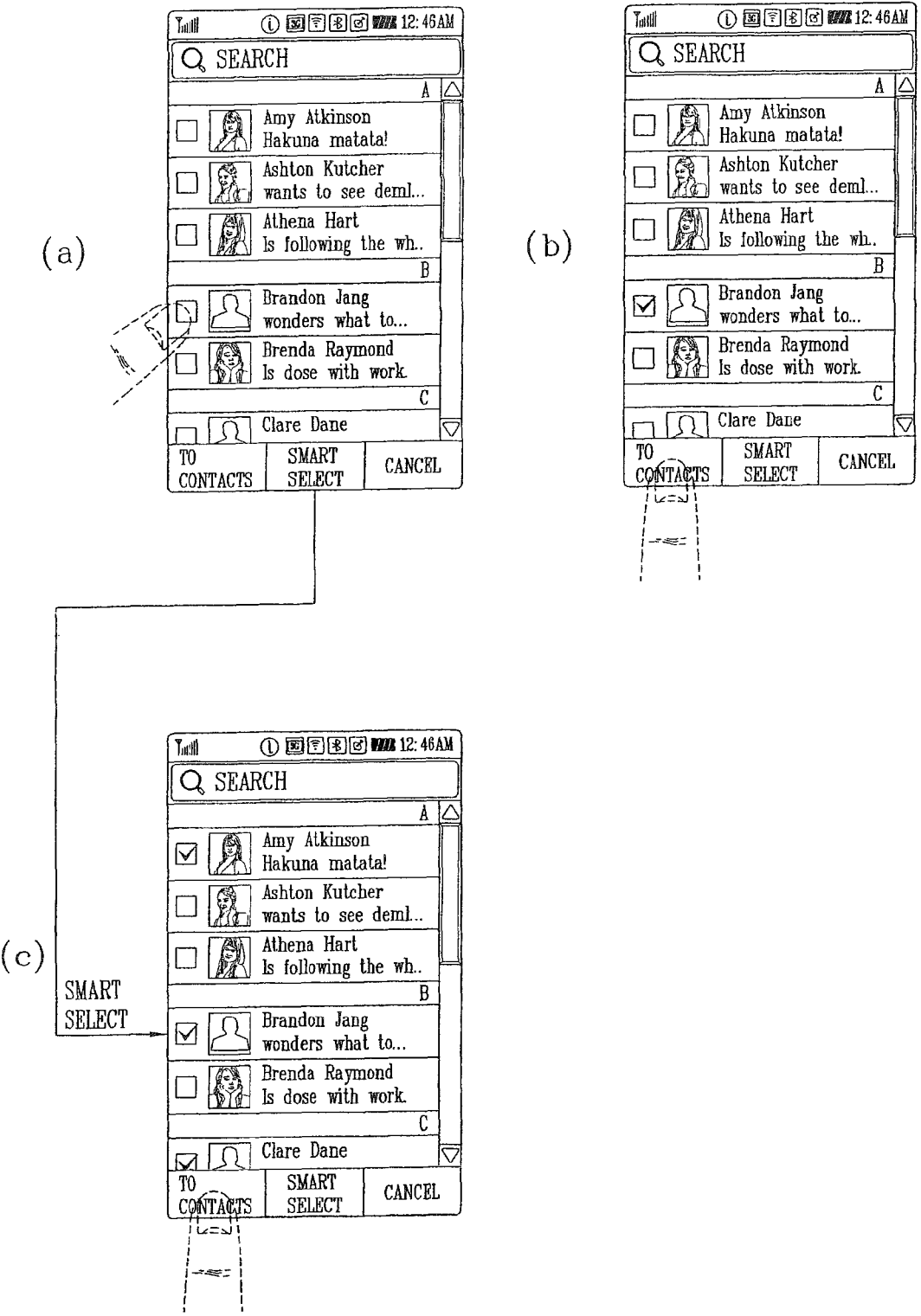
FIG. 26 illustrates display screens displayed during setting a content sharing setting with respect to a particular channel in the terminal according to an exemplary embodiment of the present disclosure.

FIG. 26 illustrates display screens for setting a content sharing setting with respect to a particular channel in the terminal according to an exemplary embodiment of the present disclosure. Referring to FIG. 26, a plurality of contacts may be listed on the display screens for selection for sharing content with other users. Namely, according to an exemplary embodiment of the present disclosure, a social networking function may be added to the particular channel.

First, the terminal 100 may display a list of previously stored contacts. As illustrated in FIG. 26(*a*), an image may be displayed with information related to each of the contacts. When one or more of the contacts is selected, a particular button may be activated to provide access to the selected contact. For example, the "To Contacts" button may initially be deactivated when no contacts are selected. Once a displayed contact is selected (e.g., a selection of "Brandon Jang" as shown in FIG. 26(*b*)), the "To Contacts" button may be activated. A selection of the "To Contacts" button may transmit a guide message to invite each of the selected contacts to share content on the content storage server 200. When a recipient receives the guide message, he may perform a registration process to gain access to the content storage server 200 and share content in the particular channel. Meanwhile, as shown in FIGS. 26(*a*) and 26(*c*), when a smart select button is selected, the terminal 100 may automatically select certain contacts based on a predetermined criteria, e.g., contacts most frequently accessed.

Figure 27:
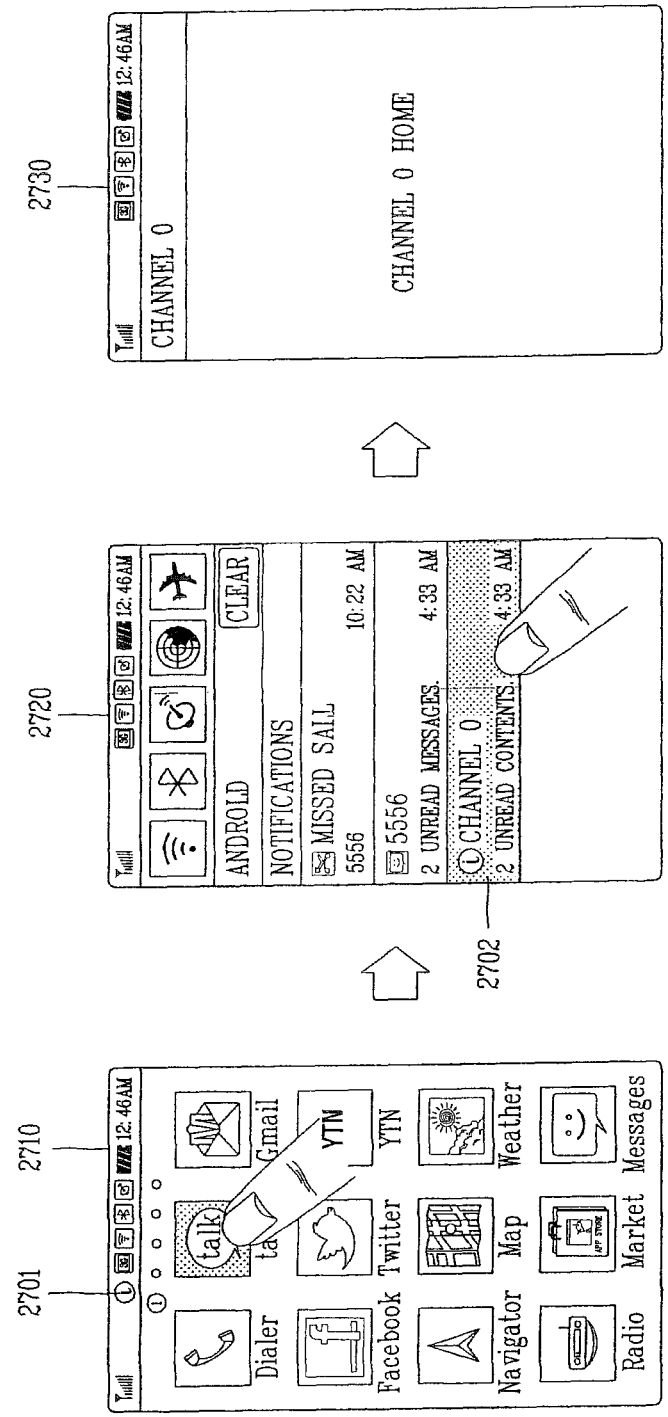
FIG. 27 illustrates display screens displayed during checking of new contents in the terminal according to an exemplary embodiment of the present disclosure.

FIG. 27 illustrates display screens to check for new contents in the terminal according to an exemplary embodiment of the present disclosure. As illustrated in FIG. 27, the terminal 100 may check whether new content is available. When new content exists, the terminal 100 may display an indicator 2701 that indicates the presence of the new content. In this case, as discussed above, the indicator 2701 may be displayed at an upper end portion of the screen 2701.

When a confirmation request related to the new contents is received from the user (e.g., when a touch input is received from the user at the indicator), the terminal 100 may display a screen 2720 showing notification messages. A notification message 2702 may be displayed to indicate a number of new contents which may be available in the particular channel. In this case, the terminal 100 may also display other information (e.g., a number of unread messages, missed call information, etc.) in addition to the information regarding the new contents. When the user selectively requests the new contents (e.g., when a touch input at the new contents related information is received from the user), the terminal 100 may display a screen image 2730 for the particular channel. A list of the new contents may be displayed on the screen image for the particular channel.

Figure 28:
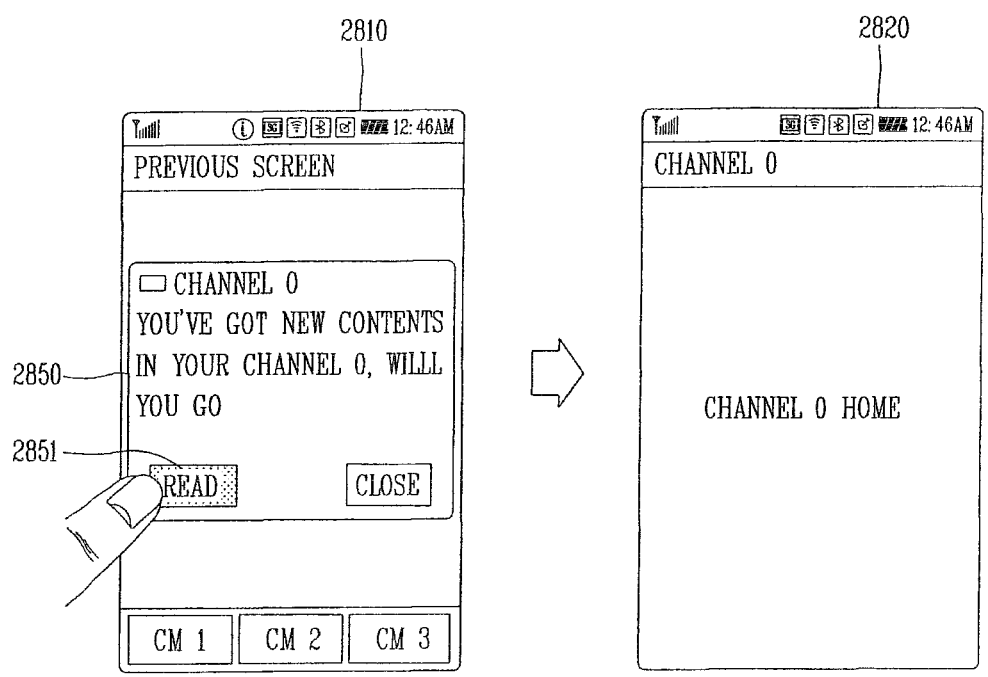
FIG. 28 illustrates display screens displayed during checking of new contents in the terminal according to another exemplary embodiment of the present disclosure.

FIG. 28 illustrates display screens to check for new contents in the terminal according to another embodiment of the present disclosure. As shown in FIG. 28, the terminal may determine whether new content is available. When new content is found, the terminal 100 may display a notification message 2850 indicating the presence of the new contents. When a confirmation request corresponding to the notification message is received (e.g., the 'Read' button 2851 is selected), the terminal 100 may display a screen image 2820 for the particular channel. A list of the new contents may be displayed on the screen image 2820 for the particular channel. This will be described with reference to FIG. 29.

Figure 29:
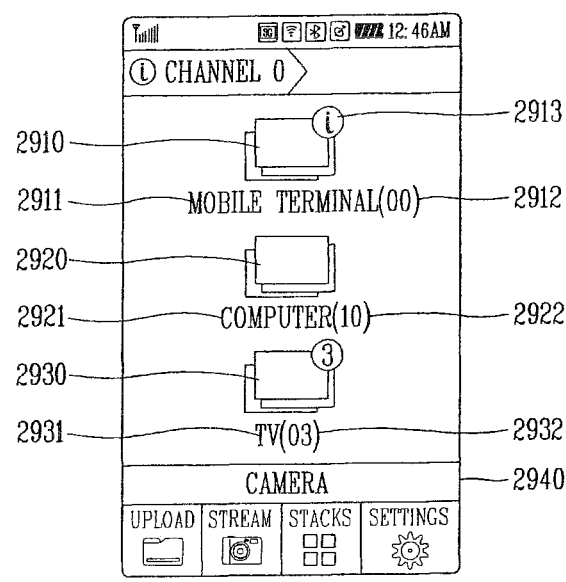
FIG. 29 illustrates display screen displayed during displaying of new contents in the terminal according to an exemplary embodiment of the present disclosure.

FIG. 29 illustrates a display screen for displaying of new contents in the terminal according to an exemplary embodiment of the present disclosure. Referring to FIG. 29, the list of new contents may be grouped by types of the contents and displayed as a folder (or stack) as described above. As illustrated, each folder may include a number 2933 displayed to indicate a number of the new contents in the folder.

Alternatively, folders (or stacks) generated by a different terminal (e.g., a remote terminal) may be displayed on the screen image for the particular channel, and a number that indicates a number of content newly generated by the remote terminal may be displayed in each folder (or stack). For example, as shown in FIG. 29, an upper folder (or stack) 2910 may be generated by the terminal 100 and shared with other terminals, a middle folder (or stack) 2920 may be generated by the computer 500 and shared with other terminals, and a lower folder (or stack) 2930 may be generated by the TV 700 and shared with other terminals.

In this case, the lower folder 2930 may include an icon 2933 having a number may be displayed on the upper right hand corner of the folder to indicate the number of newly available content in the folder (e.g., 3). Moreover, the upper folder (or stack) 2910 may include an indicator 2913 that indicates that content generated by the terminal 100 is being shared (e.g., by the "i" icon at the upper right corner of the folder). Furthermore, a number 2912, 2922, 2932 may be displayed to indicate a number of all content available in each folder 2910, 2920, 2930 (e.g., "(10)" for the middle stack as shown in FIG. 29). Also, an image related to the new content may also be displayed on each folder. Alternatively, new content may be displayed on each folder in the form of a preview image.

Figure 30:
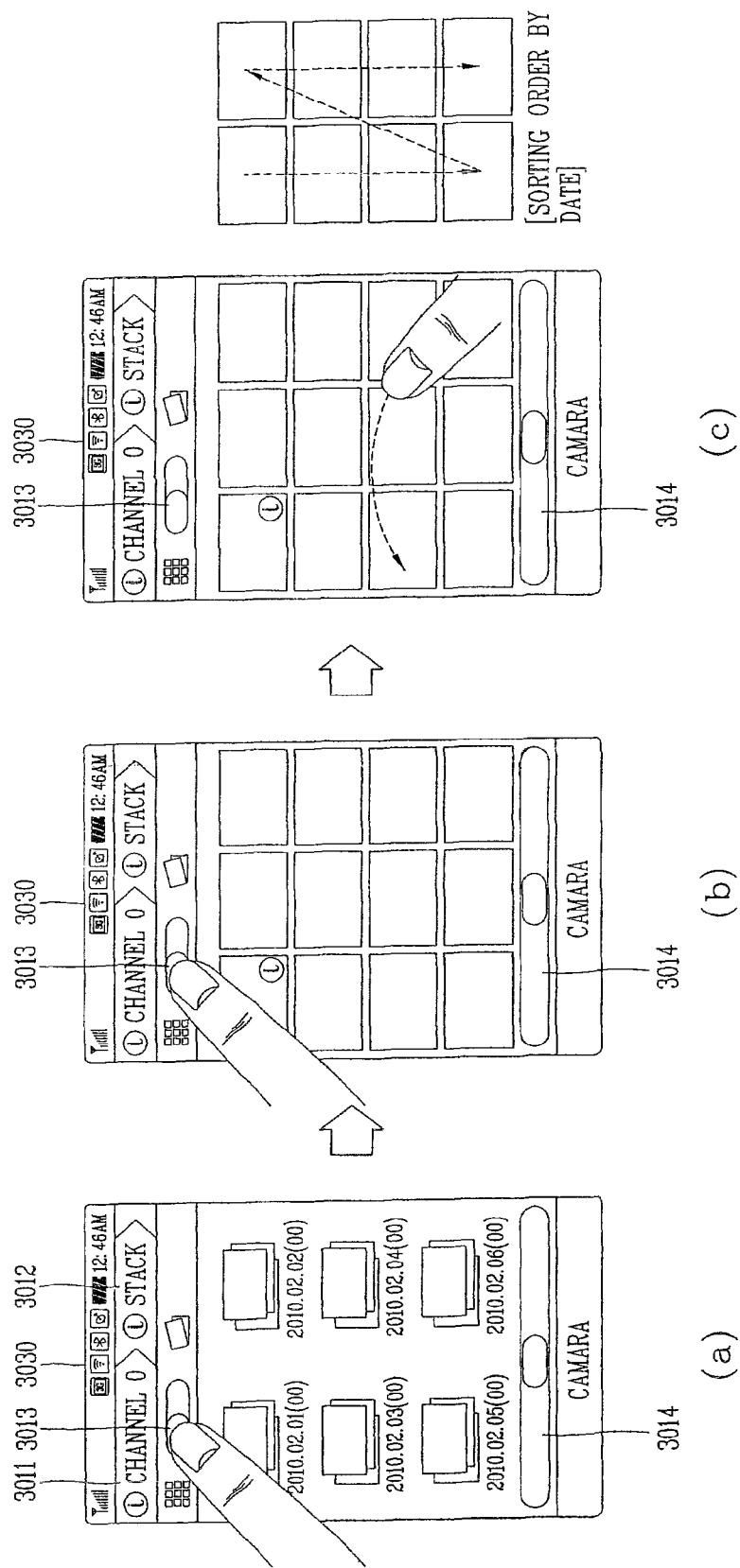
FIG. 30 illustrates display screens displayed during displaying contents in a particular channel in the terminal according to an exemplary embodiment of the present disclosure.

FIG. 30 illustrates display screens for displaying of contents in a particular channel in the terminal according to an exemplary embodiment of the present disclosure. As can be seen from FIG. 30, the list of new contents may be grouped by date of the contents and displayed as a folder as described above. Meanwhile, as illustrated, an indicator 3011, 3012 (e.g., "Channel 0" and "Stack") that show a path or position of the current display screen may be displayed at the upper left portion of the screen. Also, a button 3013 to display grouped contents to display the contents without grouping may be displayed at an upper right portion of the screen. The button may be a toggle button to slide to the left or right. As shown, when the button is moved towards the thumbnail icon, the list of new contents is displayed as thumbnail images.

Meanwhile, when there are too many newly available contents for display on the mobile terminal such that the list of new contents cannot be entirely displayed on the display screen, a scrollbar 3014 may be provided at a lower portion of the screen. The scrollbar 3014 may be moved either to the left or right to display additional content on the left or right of the displayed content, respectively.

Meanwhile, when the button 3013 for displaying the contents without grouping (e.g., thumbnail view) is selected by the user, the contents may be displayed as shown in FIG. 30(*b*). Moreover, when a particular folder (or a particular stack) is touched by the user in the screen 3010, the contents stored therein may be displayed as shown in FIG. 30(*b*). In this case, the contents may be displayed in the form of thumbnails.

When there are too many contents for display on the mobile terminal such that the list of new contents cannot be entirely displayed on the display unit, a scrollbar 3014 may be provided at a lower portion of the screen. The scrollbar may be moved either to the left or right to display additional content on the left or right of the displayed content, respectively. Alternatively, a touch-hold-drag operation may be applied on the touch screen to slide or scroll the displayed list of contents. Moreover, the contents may be sorted vertically by dates for display, as shown in FIG. 30(*c*).

Figure 31:
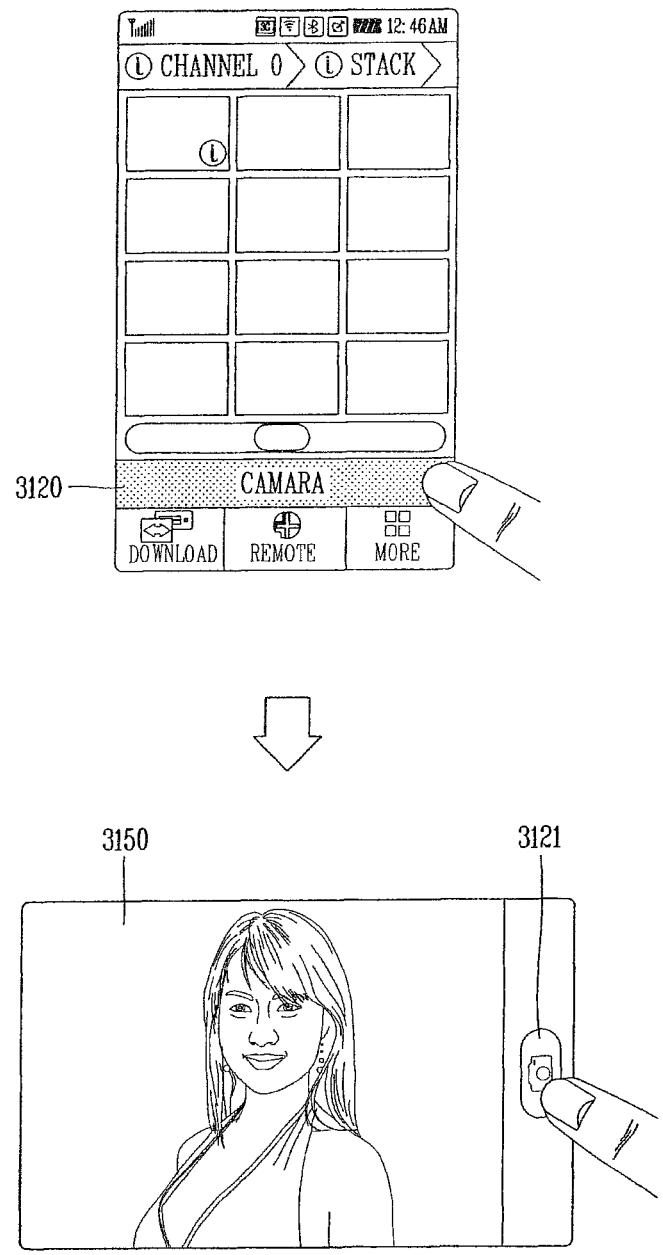
FIG. 31 illustrates display screens displayed during generating new contents in the terminal according to an exemplary embodiment of the present disclosure.

FIG. 31 illustrates display screens for generating new contents in the terminal according to an exemplary embodiment of the present disclosure. As can be understood from FIG. 31, a camera button 3120 may be displayed together with one or more contents in a particular channel. When a touch signal with respect to the camera button is received from the user, the camera may be activated, and a captured image 3150 may be displayed on the display unit. When a touch signal to capture an image is received, the image may be captured and uploaded to the particular channel of the content storage server 200. Thereafter, the content storage server 200 may transmit a notification message to the other devices sharing the particular channel. In this manner, contents may be easily uploaded to the particular channel without performing a complicated or time consuming process.

Figure 32A:
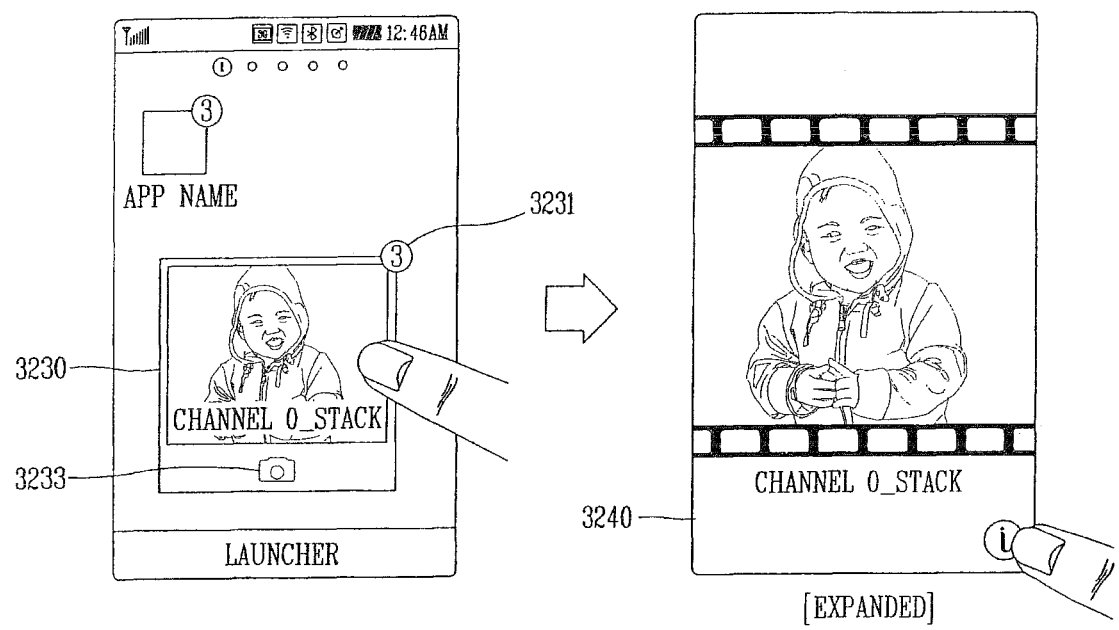
FIG. 32 illustrates display screens displayed during displaying new contents in a particular channel in the form of a widget according to an exemplary embodiment of the present disclosure.

FIG. 32 illustrates display screens for displaying new contents in a particular channel in the form of a widget according to an exemplary embodiment of the present disclosure. Referring to FIG. 32(*a*), the terminal 100 may determine whether new contents are available in a particular channel. When new content is found in the particular channel, the terminal 100 may displays the new content on a widget 3230 corresponding to the particular channel. In this case, if there are a plurality of new contents, the plurality of new contents may be displayed one by one in a rotating manner. Also, a number 3231 that indicates the number of the newly available contents may be displayed on the widget 3230 (e.g., number 3 as shown in FIG. 32(*a*)).

When the user selects the widget 3230, the terminal may display the new contents. When there are a plurality of new contents, the terminal 100 may display one content at a time. Moreover, touch inputs may be used to scroll the displayed image to the left or right to display the other remaining contents one by one on the mobile terminal 100.

Meanwhile as can be seen from FIG. 32(*b*), a camera button 3233 may be also displayed together on the widget. A selection of the camera button 3233 may activate the camera on the mobile terminal 100. When the camera is activated, the terminal 100 may display an image from the camera on the display unit. In this case, the terminal may display a button to select either photo image capturing or video capturing. The terminal may be preset to default to the photo image capturing mode. Alternatively, the terminal 100 may store a previous state of the image capture mode and may restore the mobile terminal 100 to the either the photo image capturing or video capturing modes that was most recently used.

When an image 3250 is captured in the photo image capturing mode, the captured image 3250 may be uploaded to the particular channel. In the video capturing mode, a guide screen image may be displayed to inquire whether the captured video should be immediately uploaded when captured or relayed to another terminal through the particular channel in real-time. When the real-time relay mode is selected by the user, the terminal 100 may stream the captured video to the content storage server 200. In this manner, in the present exemplary embodiment, content may be easily uploaded to a particular channel without performing a complicated or time consuming operation.

FIG. 33 illustrates display screens for outputting contents being reproduced in the terminal to a TV according to an exemplary embodiment of the present disclosure. As can be understood from FIG. 33, the terminal 100 may display contents from a particular channel on the display unit. In this case, the display unit may display a button 3311 to download the contents to the terminal 100 or a button 3312 to output the contents (e.g., Remote button or TV-out button) to an external display device, e.g., a TV, monitor, or another appropriate display device.

When the button 3312 to output the contents to the external display device is selected, the terminal 100 may attempt to access the external display device. In this case, the terminal 100 and the external display device may be connected to the Internet such that the terminal 100 may be connected to the external display device over the Internet. Once the terminal 100 is connected to the external display device, the address of the contents may be provided from the terminal 100 to the external display device. For example, the terminal 100 may transmit a URL (Uniform Resource Location), an IP address, or another addressing information to enable access to the content storage server 200.

Meanwhile, when the external display device is not connected to the Internet, the terminal 100 may relay the contents to the external display device through a Wi-Fi connection. In this case, two methods may be employed. In the first method, the terminal 100 may deliver the received contents to the external display device to be reproduced on the external display device. In the second method, the terminal 100 may reproduce the contents from the particular channel on the terminal 100 to transmit only the reproduced screen image to the external display device.

In the preceding disclosure, access to and use of a particular channel by a mobile terminal 100 have been described. Hereinafter, a use of a particular channel by a display device, e.g., a TV 700, will now be described. FIG. 34 illustrates display screens during access to a particular channel in a display device according to an exemplary embodiment of the present disclosure.

First, as described above, it is assumed that the display device, e.g., the TV 700, is registered to access the content storage server 200 and to share the particular channel with the terminal 100. As shown in FIG. 34(a), the display device may be a TV 700. The display device may receive and display a video over a channel, e.g., a drama. In this case, as shown in FIG. 34(b), when new content is available in the particular channel, e.g., the channel 0, the display device may display a notification message 3411 or an indicator related to the new contents. The notification message 3411 or the indicator may also include a number that indicates a number of new contents which may be available.

Referring to FIG. 34(c), when a select signal with respect to the notification message 3411 or the indicator is received through a remote controller, the display device may display a list of the new contents. As described above, the list of the new contents may be grouped by type or date, and may be displayed as a folder 3421 (or a stack). Alternatively, the list of the new contents may be grouped according to the device (e.g., the mobile terminal or the display device). Meanwhile, a number that indicates the number of new contents may also be displayed on each folder.

FIG. 35 illustrates display screens during access to a particular channel in the display device according to another embodiment of the present disclosure. As shown in FIG. 35(b), when new content is available in a particular channel, e.g., the channel 0, the display device may display a notification message 3411, or an indicator, with respect to the new contents.

When a select signal with respect to the notification message 3411 or the indicator is received through a remote controller, as shown in FIG. 35(c), the display device may display a second screen 3510 to display the new contents on the currently displayed screen image. The second screen 3510 may be smaller than a size of the main display screen and may overlap the main image, for example, through a PIP (Picture-in-Picture) function. In this case, when a plurality of new contents are available, the oldest contents among the plurality of new contents may be displayed first. Thereafter, in response to a signal received through the remote controller, the display device may display the next oldest new content. In this manner, the plurality of contents may be displayed in either an ascending or descending order.

Moreover, when a selective input with respect to the new contents is received, the display device may display the new contents on the entire screen. Subsequently, when a command to change to a different channel is received, or when a command to return to a previous channel is received, the display device may stop displaying the contents from the particular channel to change to the different channel or to return to the previous channel. In this case, when the display device returns to the previous channel, the previous channel may be resumed from a previously viewed point in the content. For example, the previous content may be stored in a buffer to allow a user to resume viewing the content at a point when the channel was changed.

FIG. 36 illustrates display screens displayed during access to a particular channel in the display device according to another embodiment of the present disclosure. As shown in FIG. 36(a), when new content is available in the particular channel, e.g., the channel 0, the display device may display a notification message 3411, or an indicator, with respect to the new contents.

When a select signal with respect to the notification message 3411 or the indicator is received through a remote controller, as shown in FIG. 36(b), the display device may display a list of the new contents in the form of folders 3621-3622 on the currently viewed screen. When the user selects one of the plurality of folders, the display device may display the contents of the folder in the form of a thumbnail 3631. In this case, the currently viewed screen image may be continuously displayed in a first thumbnail 3631, as shown in FIG. 36(c). Meanwhile, if the display of the list of new contents is scrolled to another page (including the thumbnail 3631 having the currently viewed screen image), the currently viewed screen image may then be displayed at the first thumbnail on the new page. In this manner, the currently viewed screen image may be continuously displayed while the user browses through the list of newly available contents.

Figure 37:
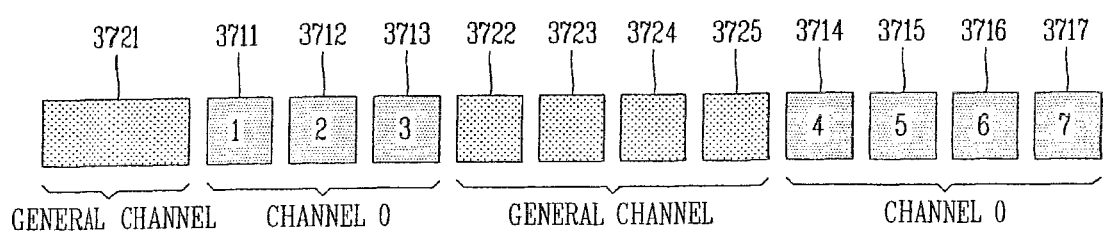
FIG. 37 illustrates display screens during access to a particular channel in the display device according to yet another exemplary embodiment of the present disclosure.

FIG. 37 illustrates display screens during access to a particular channel in the display device according to another embodiment of the present disclosure. Referring to FIG. 37, seven new contents 3711-3717 may be available in a particular channel, namely, in the channel 0. The seven new contents 3711-3717 are represented by the seven squares having numbers from 1 through 7. Initially, a content from the general channel may be displayed on the display screen. Then, in response to a user input to access channel 0, the first 3711, second 3712, and third 3713 contents in the channel 0 may be reproduced. When an input is received to return to the general channel, a display of the content on the general channel 3721 may be resumed starting from a portion which was not previously viewed, e.g., the content on the general channel 3721 may be buffered. Thereafter, when a second request to access the channel 0 is received, the display device may display the remaining newly available contents, e.g., starting from the fourth content 3714 which was not previously viewed. Moreover, if the third content 3713 which was previously viewed is a video and which was not completely viewed previously, the display of the new content may resume on the third content 3713, starting from the portion which was not previously reproduced.

FIG. 38 illustrates display screens for controlling the display device using the mobile terminal according to an exemplary embodiment of the present disclosure. As shown in FIG. 38, when the mobile terminal 100 is connected to the display device, a screen image 3820 of the display device may be displayed on the mobile terminal 100. The mobile terminal 100 may then be used to control the display on the display device. For example, when a touch input on the displayed screen image 3820 is received, the display device may recognize it as, for example, an 'OK' command of a remote controller. Also, while an image is being displayed on the display device, a touch input to scroll or move the screen on the terminal 100 may be recognized by the display device as a 'Next' or 'Previous" command of the remote controller. The display device may then change the displayed image accordingly to display a next image or a previous image. Also, while a video (or other type of multimedia content) is being displayed or reproduced on the display device, when a user uses his finger (or other object) to touch the screen of the terminal 100 and moves (or drags) his finger in a certain direction, the display device may recognize this touch-and-drag input as either a 'Next' command (e.g. fast forward or advance) or a 'Previous' command (e.g. rewind or go back) of the remote controller. In response to the input on the mobile terminal 100, the display device may process the video (or content) such that (continuous or discontinuous) playback is either moved forward (advanced) a few seconds or moved backward (reversed) a few seconds.

The display terminal and method as embodied and broadly disclosed herein may allow a plurality of terminals to participate in a content sharing service to effectively share contents stored on a content storage server. The method may allow for effective management of content stored on a content storage server according to an item selection by displaying an accessed screen image including one or more of an upload item, a stream item, or a view item when the content storage server is accessed.

The method for sharing contents by a terminal may include accessing a content storage server; displaying a screen including at least one of an upload item, a stream item, or a view item, the screen being provided by the accessed content storage server; and performing a contents controlling operation corresponding to a selected item when one of the upload item, the stream item, and the view item is selected.

The performing of the contents controlling operation may include, when the upload item is selected, selecting any one of at least one contents previously stored in the terminal; and uploading the selected contents to a particular storage area among the at least one storage area. Moreover, the performing of the contents controlling operation may include, when the stream item is selected, driving an application related to a camera in order to receive an external image; and uploading an external image input through the camera to a particular storage area among the at least one storage area in real-time according to the driving of the application related to the camera.

The performing of the contents controlling operation may further include, when the view item is selected, displaying at least one identifier corresponding to the at least one storage area; and when a particular identifier among the at least one identifier is selected, outputting particular contents among at least one contents stored in the storage area of the selected particular identifier.

In another embodiment, a method for displaying contents on a terminal, may include, when there are one or a plurality of new contents in a particular channel, displaying an indicator indicating the presence of the one or the plurality of new contents; when an acknowledgement request with respect to the one or the plurality of new contents is received in response to the indication of the indicator, displaying a list of the one or the plurality of new contents; and, when a selective input with respect to the displayed one or the plurality of new contents is received, entering a particular channel to display the particular contents.

In this embodiment, the particular channel may be shared with a digital device of a different user designated by the user of the terminal. The particular channel may be channel 0 in broadcast. Moreover, the particular channel may correspond to the channel 0 in one of a digital multimedia broadcasting (DMB), a digital video broadcasting-handheld (DVB-H), MediaFlow, and an Internet protocol-TV (IP-TV). Furthermore, the new contents may be generated from the digital device of the different user designated by the user of the terminal. The method may further include, when there are one or a plurality of new contents, displaying a notification message.

In this embodiment, the method may further include, when an acknowledgment request with respect to the one or the plurality of new contents is received, displaying a screen image according to the particular channel, wherein the list of the one or the plurality of new contents may be displayed on a screen image according to the particular channel. The method may further include, after displaying the list of the one or a plurality of new contents is displayed, activating a camera in response to a reception of a camera activation command from a user; and, when an image or a video is being captured after the camera is activated, immediately uploading the captured image or video to the particular channel.

In yet another embodiment, a method for displaying contents on a digital contents display device may include displaying contents selected by a user; when there are one or a plurality of new contents in a particular channel, displaying an indicator indicating the presence of the one or the plurality of new contents on a screen image of the selected contents; when an acknowledgement request with respect to the one or the plurality of new contents is received in response to the indication of the indicator, displaying a list of the one or the plurality of new contents; and when a selective input with respect to the displayed one or the plurality of new contents is received, stopping the displaying of the selected contents and displaying the particular contents.

The contents selected by the user may be a broadcast channel, and the particular channel may be Channel 0 in broadcast. The particular channel may be shared with a digital device of a different user designated by the user of the terminal. Moreover, the new contents may be generated by the digital device of the different user designated by the user of the terminal.

In yet another embodiment a terminal, as embodied and broadly described herein, may include a display unit configured to display an indicator indicating the presence of one or a plurality of new contents when the one or the plurality of new contents are present in a particular channel, and displaying a list of the one or the plurality of new contents when an acknowledgement request with respect to the one or the plurality of new contents is received in response to the indication of the indicator; and a processor configured to enter a particular channel to receive particular contents when a selective input with respect to the particular contents, among the one or the plurality of displayed new contents, is received, and displaying the particular contents on the display unit.

The terminal and method for sharing contents thereof according to exemplary embodiments of the present disclosure have the following advantages. First, a plurality of terminals registered to the content storage server to perform a content sharing service may effectively share contents. Second, because an access screen including an upload item, a stream item, a view item, or the like, may be provided, an operation of controlling contents corresponding to an item selected by the user may be performed. Third, when new contents are uploaded to the content storage server, the corresponding information may be provided to the registered terminals, whereby the terminal may quickly check the newly uploaded contents.

A method for displaying contents on a display of a terminal, as embodied and broadly described herein, may include displaying an indicator that indicates a presence of at least one new content available in a channel; displaying a list of the at least one new content in response to an acknowledgement request corresponding to the indicator; and connecting to the channel to display the at least one new content in response to an input, wherein the input is a selection of one or more of the at least one new content in the displayed list.

In this method, the channel may be shared between a plurality of terminals designated to share the channel. A broadcast signal may be received through the channel. Moreover, the channel may be based on at least one of a digital multimedia broadcasting (DMB), a digital video broadcasting-handheld (DVB-H), MediaFlow, or an Internet protocol-TV (IP-TV).

In this embodiment, the at least one new content may be stored on a remote terminal designated to share the channel. The method may further include displaying a notification message when the at least one new content is available and displaying a home page of the channel in response to the acknowledgement request corresponding to the indicator, wherein the list of the at least one new contents is displayed on the home page of the channel. Moreover, this method may further include displaying a camera activation button in response to the acknowledgement request; activating a camera to capture an image or video in response to a camera activation command; and immediately uploading a captured image or video through the channel when the image or video capture is complete.

In another embodiment, a method for displaying content on a digital display device may include displaying a first content; displaying an indicator that indicates a presence of at least one new content available in a channel, wherein the indicator is displayed together with the first image; displaying a list of the at least one new content in response to an acknowledgement request corresponding to the indicator; and stopping the display of the first content and displaying a second content in response to a selection of at least one new content in the displayed list, wherein the second content is a selected new content.

In this embodiment, the at least one content selected is a broadcast content, and the channel is a broadcast channel. The channel may be shared between a plurality of terminals designated to share the channel. Moreover, the at least one new contents may be generated a remote terminal designated to share the channel.

In yet another embodiment, a display terminal as embodied and broadly described herein may include a display configured to display an indicator that indicates a presence of at least one new content available in a channel, and display a list of the at least one new content in response to an acknowledgement request corresponding to the indicator; and a controller configured to establish a connection to the channel to retrieve at least one selected content, wherein the at least one selected content may be retrieved in response to a selection from the list of the at least one new content available on the channel.

In another embodiment, a method for sharing content at a display terminal may include accessing a content storage server; displaying an image including at least one of an upload icon, a stream icon, or a view icon, the image being provided by the accessed content storage server; receiving a selection of the at least one of the upload icon, the stream icon, or the view icon; and performing a content sharing operation in response to the received selection.

In this embodiment, the performing the content sharing operation may include selecting at least one content previously stored in the terminal in response to a selection of the upload item; and uploading the at least one selected content to a storage area on the accessed content storage server. Moreover, the performing of the content sharing operation may further include capturing an image at a camera in response to a selection of the stream icon; and streaming the captured image to the accessed content storage server in real time. The performing of the content sharing operation may also include displaying at least one identifier corresponding to at least one storage area on the accessed content storage server in response to a selection of the view item; receiving a selection of a displayed identifier corresponding to the at least one storage area; and retrieving content stored in the selected storage area in response to the selection of the displayed identifier.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such featire, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device comprising:
   a display;
   a wireless communication unit; and
   a controller coupled to the display and the wireless communication unit, the controller configured to:
   connect to a server via the wireless communication unit;
   receive a message indicating that video contents are being uploaded in real time to the server when an external device which is connected with the server uploads the video contents to the server in real time;
   display the message when the message is received; and
   display on the display the video contents based on a selection of the message when the video contents are currently being uploaded in real time from the external device.

2. The device of claim 1, wherein the server is shared between a plurality of devices designated to share the video contents.

3. The device of claim 1, wherein the message is received through the server.

4. The device of claim 1, wherein the server is based on at least one of a digital multimedia broadcasting (DMB), a digital video broadcasting-handheld (DVB-H), MediaFlow, or an Internet protocol-TV (IP-TV).

5. The device of claim 1, wherein at least one new video content for uploading is stored on the external device designated to share the server.

6. The device of claim 1, further comprising a camera,
   wherein the video contents are captured by the camera in response to a capture command, and
   wherein the video contents are immediately uploaded through the server when the video contents capture is complete.

7. A method for sharing content at a device, the method comprising:
   accessing a server via a wireless communication unit;
   receiving a message indicating that video contents are being uploaded in real time to the server when an external device which is connected with the server uploads the video contents to the server in real time;
   displaying the message on a display when the message is received; and
   displaying the video contents on the display based on a selection of the message when the video contents are currently being uploaded in real time from the external device on the display.

8. The method of claim 7, wherein the server is shared between a plurality of devices designated to share the contents.

9. The method of claim 7, wherein the message is received through the server.

10. The method of claim 7, wherein the server is based on at least one of a digital multimedia broadcasting (DMB), a digital video broadcasting-handheld (DVB-H), MediaFlow, or an Internet protocol-TV (IP-TV).

11. The method of claim 7, wherein at least one new video content for uploading is stored on the external device designated to share the server.

12. The method of claim 7, further comprising:
    capturing the video contents using a camera in response to a capturing command; and
    immediately uploading the video contents through the server without a separate control command for uploading the video contents.

* * * * *